United States Patent
Cline et al.

(10) Patent No.: US 12,088,569 B1
(45) Date of Patent: Sep. 10, 2024

(54) PROTOCOL FREE ENCRYPTING DEVICE

(71) Applicant: The Government of the United States as represented by the Director, National Security Agency, Ft. George G. Meade, MD (US)

(72) Inventors: Joshua E. Cline, Edgewater, MD (US); Dan A. DeVries, Brooklyn, MD (US); William J. Layton, Sykesville, MD (US); Zachary Smith, Severn, MD (US); Brendan S. Surrusco, Highland, MD (US); Andrew H. White, Catonsville, MD (US); David F. Wiecek, Ft. George G. Meade, MD (US); Mitchell E. Buchman, Hanover, MD (US)

(73) Assignee: Government of the United States as represented by the National Security Agency

( * ) Notice: Subject to any disclaimer, the term of this patent is extended or adjusted under 35 U.S.C. 154(b) by 0 days.

(21) Appl. No.: 18/100,312

(22) Filed: Jan. 23, 2023

Related U.S. Application Data

(63) Continuation of application No. 17/200,468, filed on Mar. 12, 2021, now Pat. No. 11,588,798.

(60) Provisional application No. 62/988,484, filed on Mar. 12, 2020.

(51) Int. Cl.
| | |
|---|---|
| *H04L 9/40* | (2022.01) |
| *G06F 21/60* | (2013.01) |
| *H04L 45/74* | (2022.01) |
| *H04W 28/06* | (2009.01) |

(52) U.S. Cl.
CPC ........ *H04L 63/0471* (2013.01); *G06F 21/602* (2013.01); *H04L 45/74* (2013.01); *H04L 63/0272* (2013.01); *H04W 28/06* (2013.01)

(58) Field of Classification Search
CPC . H04L 63/0471; H04L 63/0272; H04L 45/74; G06F 21/602; H04W 28/06
See application file for complete search history.

(56) References Cited

U.S. PATENT DOCUMENTS

| | | | |
|---|---|---|---|
| 6,253,321 B1 * | 6/2001 | Nikander | H04L 63/164 |
| | | | 713/168 |
| 6,922,774 B2 | 7/2005 | Meushaw et al. | |
| 7,712,143 B2 | 5/2010 | Comlekoglu | |
| 7,809,955 B2 | 10/2010 | Comlekoglu | |

(Continued)

*Primary Examiner* — Philip J Chea
*Assistant Examiner* — Sangseok Park

(57) ABSTRACT

The present invention provides an encrypting device including an encryption unit and a communications unit. Paired encrypting devices allow for communication of trusted data between trusted devices over an untrusted network. Data received by the encryption unit is encrypted and provided with a connectionless header for delivery to the communications unit. Data received by the communications units is provided with a complex header for delivery to the paired encrypting device. The encrypting devices may be implemented in hardware or may be virtualized on a server or a plurality of severs. Arrangement of the encrypting devices in a hub-and-spoke topology allows for communication amongst a plurality of trusted devices. The encrypting devices can be used to covert commercially available equipment suitable for high assurance environments.

3 Claims, 18 Drawing Sheets

(56) References Cited

U.S. PATENT DOCUMENTS

| | | |
|---|---|---|
| 10,630,467 B1 | 4/2020 | Gilbert et al. |
| 11,095,610 B2 | 8/2021 | Gilbert et al. |
| 11,689,359 B2 | 6/2023 | Gilbert et al. |
| 2012/0201383 A1* | 8/2012 | Matsuo .................... H04L 9/12 380/255 |

* cited by examiner

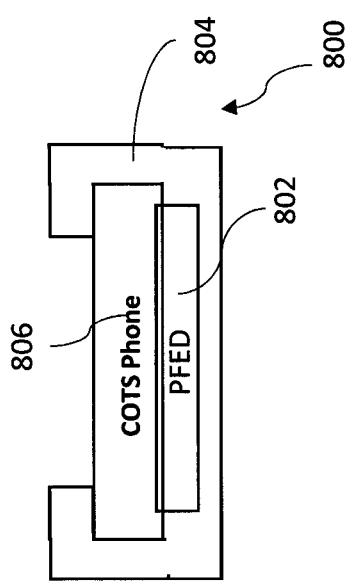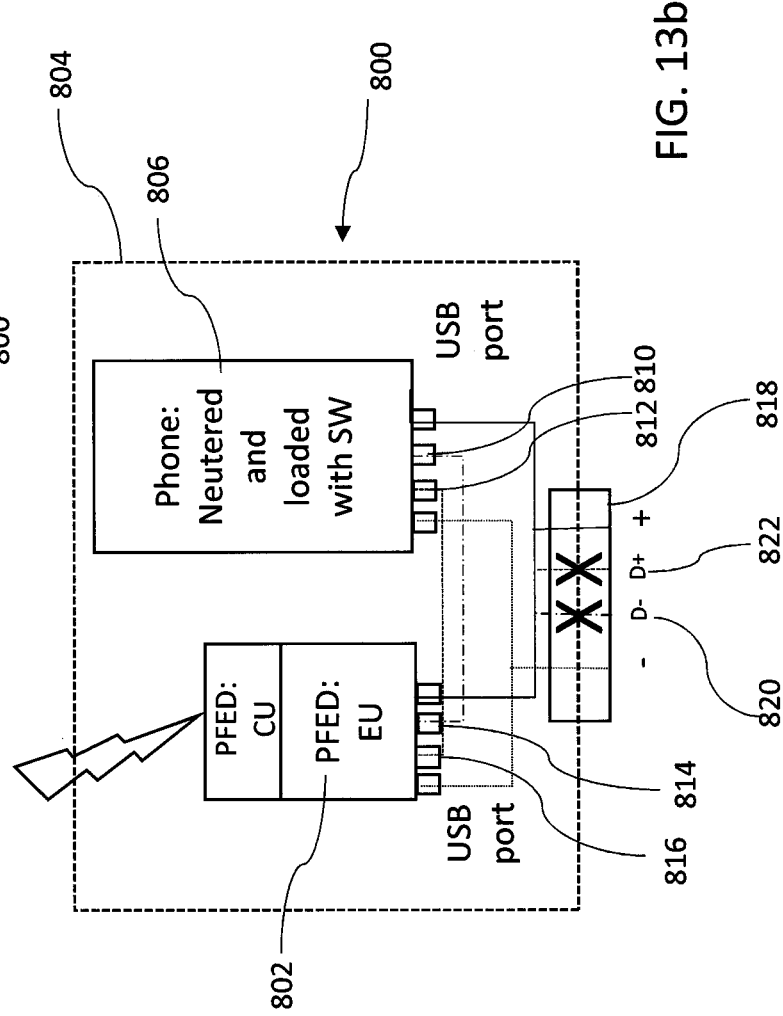
FIG. 13a
FIG. 13b

PROTOCOL FREE ENCRYPTING DEVICE

This application is a continuation of U.S. application Ser. No. 17/200,468 filed Mar. 12, 2021 which claims the benefit of U.S. provisional patent application Ser. No. 62/988,484 filed Mar. 12, 2020, which is hereby incorporated by reference.

FIELD OF THE INVENTION

This invention is generally directed to an encrypting device allowing communications between trusted devices over an untrusted network.

BACKGROUND OF THE INVENTION

An important principle of high assurance systems is that the data in transit must remain secure against attacks from adversaries under all operating conditions. This is what is meant by "high assurance". In some instances, for example in the case of government national security systems, the time frame for maintaining confidentiality of the traffic is often decades. Maintaining confidentiality over this time period requires that the code protecting the data in transit runs only as expected; that the encryption key remains a secret; that the cryptographic algorithm and its implementation remain strong enough to resist cryptanalysis at the time the data was transmitted and future cryptanalysis utilizing future more powerful computer processing power; and the code must remain compatible with network technology that is constantly changing. Meeting these goals is challenging and dictates tradeoffs that often don't need to be considered in systems which do not require high assurance. This has created a high assurance community and has led to well-understood design and implementation choices for high assurance.

FIG. 1 illustrates the basic requirement of a high assurance system 10 where isolation is provided between a trusted environment 12 and untrusted environment 14 via a cryptographic trust boundary 16 provided by a cryptographic engine; i.e., no data from the trusted network must be able to leave the trusted network before entering the cryptographic engine (see arrow 20) and no data must be able to enter the trusted network without entering the cryptographic engine first (22). If data from the untrusted network enters the trusted network without first passing through the cryptographic engine or if data from the trusted network is provided to the untrusted network before passing through the cryptographic engine, these events are identified as breaches. Breaches can be accidental or intentional. A high assurance system requires the ability to thoroughly analyze all communications passing between the trusted and untrusted networks. A formal boundary is necessary to enable such a thorough analysis of the communications. A concrete boundary with explicit delineation between the trusted and untrusted network makes it easier to validate isolation between the trusted and untrusted networks and thus easier to certify the appropriate assurance level of a design or implementation. Conversely, the less defined a boundary is, the harder it is to validate a design or implementation at a high level of assurance.

Another important requirement of high assurance system is that before any information on the trusted network is compromised, the breach resulting in such compromise must only have occurred by overcoming multiple countermeasures. A system in which a single event can result in a breach of the trust boundary, the system does not meet the requirements of a high assurance system. As noted above, breaches may be induced intentionally or accidentally. For example, intentional breaches may occur when an adversary injects malicious data from either the trusted network or the untrusted network, or when an adversary places a probe on a bus where plain text data is traveling (before it enters the crypto engine). An accidental breach may occur when a critical circuit, such as for example, a randomizer fails on its own. A high assurance system requires additional protection built into the system to make single event faults ineffective. The cryptographic engine must also enforce the multiple-failure principle to protect the integrity of the algorithm implementation and the confidentiality of the cryptographic key. Generally speaking if a failure is detected, then the high assurance system must fail "closed"; i.e. the high assurance systems must fail in such a way that data is not allowed to enter or leave the trusted network. Meeting this type of fail-safe methodology can be challenging using normal commercial architectures because for practical reasons, they combine many functionalities within the same trust boundary. All of these functionalities aren't required for a particular application and they introduce millions of lines of code to the system. Thus, it is impossible to study all possible failure paths without also analyzing an entire large, complex system.

Generally speaking an adversary's attacks on the cryptographic engine fall in two categories 1) attacks on the cryptographic algorithm mathematically; or 2) attacks on the cryptographic engine itself and the key management. A typical attack on the engine might be to send malformed data at it to induce a fault that is poorly handled or was not considered by the system developer. This causes a leak of trusted data. In today's world, many of the publicly available cryptographic algorithms implemented are sufficient to defeat mathematical attacks on the cryptographic algorithm at high assurance levels (e.g. AES 256 bit). There is no general solution, however, to mitigate the second category of attacks. Thus, the challenge for high assurance evaluators, designers and implementers to confirm that a device defends against the cryptographic engine itself requires an understanding of the entire functionality of a device in order to predict (or test) where failures might occur and how they are prevented. The more complete the understanding is, the more likely a device will maintain data confidentiality/the trusted boundary. Most cryptographic implementations are non-trivial because the intended use cases aren't trivial. For example, a trivial system might be designed to use a single algorithm on a single link and intended for pre-vetted users. This is a very simple model to validate. As time progresses and it's re-implemented for other situations as more demands are applied (e.g. it must also handle un-vetted users and must handle multiple kinds of network interfaces and more algorithms), the accesses into and out of the overall system become difficult to fully understand as the features increase the complexity geometrically not linearly. The result is an increased accepted risk present over the lifetime of the device.

There are three general models of cryptographic engines 1) a software-based encryption model, 2) a dedicated hardware model and 3) a software-hardware hybrid model. The software model generally incudes cryptographic software running in a process on an operating system running on a conventional microprocessor (e.g. Windows on an x86-based computer using transport layer security (TLS) in a browser or networking with a VPN). The dedicated hardware model provides for the use of hardware (e.g. an ASIC or FPGA) with specific cryptographic functionality. The hybrid model provides very limited software performing a single, dedicated task on hardware such as a microcontroller (e.g. Arduino). The microcontroller runs a single program and does not include an operating system. Each cryptographic engine model has strengths and weaknesses.

A software-based encryption model 30 is illustrated in FIG. 2. The trusted environment 32 includes an operating system hosting any number of software address space components represented by 34a-c, 38a-c, 40, and 42. A number of software applications 34a-34c interacting with a number of devices 36a-36c in an untrusted environment. Interface drivers 38a-38c are provided for communicating with the untrusted devices 36a-36c. A VPN 40 controls access to the network stack 42 and serves as the cryptographic engine protecting the data in transit to the software applications 34 a-34c. The isolation between any software component is accomplished logically, not physically. The dashed lines within the operating system in FIG. 2 represent examples of the many feasible, implicit but unintended paths between the components. Effectively, every software component has at least an implicit path to every other software component. The VPN provides cryptographic isolation between the application 34a-34c and the untrusted network 36b. Because there are alternative paths to get to the applications, however, the VPN does not provide a robust and complete form of isolation unless all of the alternative paths can be accounted for. These unintended paths result from a failure in any of the software components to operate as intended and represent a potential unexpected path for attacker-influenced network packets to bypass the VPN and reach the trusted application address spaces. The requirement that the network packets be correctly processed by the extensive amount of software through all of these potential paths presents an impossible challenge for a device like FIG. 2 to achieve high assurance properties. If any of the paths between the untrusted network and the trusted network are not carefully constrained, the trust boundary will be breached. Because of the difficulty in constraining all of these paths, historically very few software-based systems have been successfully secured to high assurance.

A dedicated hardware model 50 is illustrated in FIG. 3. As illustrated in FIG. 3, the isolation between the trusted environment 54 and untrusted environment 56 is physically provided by microcontroller 52. The paths across the trusted boundary are conclusively analyzable and therefore can be the basis for a strong security implementation. The disadvantage of using a dedicated hardware model is that the functionality of microcontroller is not significantly flexible to function in a typical system. A further disadvantage is that a microcontroller does not have the horsepower to do high strength cryptography. Yet a further disadvantage is that in order to provide the necessary redundancy to be fail-safe, two microcontrollers are required.

A hybrid hardware-software model 60 is illustrated in FIG. 4 and provides the preferred model to be used for high assurance implementation. This hybrid model utilizes an FPGA 62 or an ASIC to provide physical isolation between the trusted and untrusted environments 63, 64. Unlike the dedicated hardware model, the FPGA/ASIC retains the programmability and therefore can be customized to perform specific operations. In addition, an FPGA/ASIC is powerful enough to do high strength cryptography. Custom built hardware such as an FPGA can allow one to claim complete knowledge of what went into the logic (and didn't) as it can be built from the ground up by trusted developers. In addition, the FPGA/ASIC logic can be designed to perform unique custom operations not typically available with a conventional CPU. As illustrated in FIG. 4, the FPGA layout can meet the fail-safe principle by forcing at least two failures. Modules A and C of the FPGA perform cryptographic functions that encrypt or decrypt data presented by the EUD or Network respectively. Module B is a comparator. The results from modules A and C are provided to module B for comparison. If the results compared by module B are equal, the data is allowed through the trusted boundary in the respective direction. This FPGA layout allows the cryptographic engine to meet the fail-safe principle because only two identical failures in modules A and C will result in a breach of the trusted boundary.

Typically, once a hardware implementation is certified, the hardware is built and supplied by a trusted supplier. Thus, a hardware implementation is less vulnerable than an otherwise secure software implementation of the same algorithm to a supply chain attack. At scale, it is just harder to maliciously change a custom chip than it is to change software. Hardware implementations are however nontrivial to implement. Implementing an algorithm for an FPGA or ASIC requires specialized skills and equipment and the chips must be physically integrated into an overall solution. In addition, updating a hardware implementation is difficult. In comparison, software implementations are not costly or difficult to implement. The manufacture or update of software only requires compilation of source code for a cryptographic application/library and the download and installation of the application. No soldering iron necessary. It is easier/cheaper/etc. to mold software-based encryption into a typical enterprise IT network versus a dedicated hardware model or a hybrid model. Ostensibly, an encrypted network packet is agnostic as to how it was created. If the adversary only has access to the encrypted packet (i.e. not access to the device that generated it), it is no more or less cryptographically strong if it was AES 256 bit encrypted by software or AES 256 bit encrypted by hardware. So software-based encryption is "good enough" for many commercial cases. The "value" of the data drives the adversary and the consequence of loss of the data determines the amount of effort that will be made to protect the data.

Obviously, loss or discovery of the key is a catastrophic failure. Thus, an additional cryptographic boundary is required to protect the confidentiality of the key. For example, while the key is in use (thus exposed), it must be ensured that the key is not easily leaked/accessible by any other part of the system; or that the key can't be inferred by side channels, etc. A traditional hardware implementation like FIG. 4 illustrates a concrete boundary. In theory, module A and C are the only places in the entire system where the unwrapped key exists. Thus, only the paths to unwrap and place the key into A and C need to be analyzed to validate the integrity of the key is maintained.

Cryptographic systems typically implement a bypass in order to communicate in the clear across the trust boundary during some part of their lifecycle. For example, when initially negotiating cryptographic parameters between two anonymous parties (e.g. TLS) to establish a route to a new endpoint before beginning encryption; or to manage some aspect of the network on the untrusted side. Any bypass represents a breach potential and must be carefully validated. This adds to the design and validation costs required to achieve high assurance.

The overall cost of a high assurance system is a result of interplay between three distinct communities: vendors who propose a design and produce product; evaluators who validate that the design/product meets high assurance standards; and users who purchase the product. Vendors and evaluators are not typically the same entity and often do not share the same goal. However, the adversarial nature between the vendors and evaluators will produce a high assurance solution for the users.

Historically, producing a certified high-assurance implementation within this ecosystem is costly and lengthy. Vendors must create solutions from the ground up using complex, expensive technologies. Maintaining a high-assurance certification with the inevitable change in the IT ecosystem will force new certification. Evaluators must understand many of these unique implementations thoroughly in order to certify that the solution will survive the test of time. This does not scale well and it creates a perverse incentive to lock in yesterday's technology given the heavy lift needed to stay technologically current while being certified.

Key management is necessary as the number of devices grows in a system. Keys and certificates must be securely created, delivered, updated, revoked, and validated throughout the long time-frame that the system is operational. Creating the infrastructure required to manage keys securely is costly and operating the infrastructure adds sustainment costs for the users.

Given the high (sunk) cost of high assurance devices, users are reluctant to refresh them more frequently. This perpetuates a costly support tail for both the users and the vendors as the lifecycle goes out a few decades due to limited availability of parts and keeping personnel on the payroll. High assurance crypto gear is not disposable.

For all of the reasons described, high assurance cryptography remains hard to achieve for vendors, evaluators and users. Low cost, easy to use, sustainable, and high performance is difficult to accomplish in a single standalone package. Adding the size, weight and power (SWAP) requirements that a mobile use case demands makes this accomplishment even harder.

An example of a mobile use case in which high assurance is desired is a mobile phone. Stock commercial mobile devices fail as high assurance devices because the radios associated with the mobile phone is within the trusted boundary. Radios host and run an extensive amount of software (often millions of lines of C code), most of which has unknown provenance, all of which is directly accessible from the untrusted network, all of which has access to the rest of the device, and none of which has been seriously analyzed from a high-assurance failure point of view. The radio package is not under the control of the user. The radio's implementation is dictated by the device manufacturer, the radio chipset manufacturer and the network operator(s). It may or may not have a security feature. The radio's underlying implementation can be changed at any time, often remotely and outside of the user's awareness or control. The radio is highly privileged and has direct connectivity to many other modules on the phone. Even if a radio is physically separate, it will remain logically connected (thus trusted) to other parts of the platform to maintain low cost, flexibility and a good user experience. Furthermore, the addition of traditional FPGA encryption modules by the vendor to safely isolate the rest of the platform, where critical user data lives, from the toxic radio subsystem is undesirable because FPGA's are power hungry, large, and run hot. Any security benefit provided by a radio of a commercial-off-the-shelf (COTS) device is accidental. No piece of code of the size associated with a COTS radio in history has ever been immune from exploitation. Worse, any failure within the radio software can be leveraged to an immediate compromise of the whole device because the radio subsystem is a highly privileged trusted part of the platform that must work with other parts of the platform such as the power management subsystem, the application processor, etc. in order to deliver a competitive user experience.

SWAP dictates how COTS devices are built and how the supply chain of components are built. To get the best SWAP that market pressures dictate, mobile architectures strive to have the fewest additional parts, thus the least amount of separation possible, logical or physical. As the manufacturing technology improves, components are shrinking and condensing multiple functionalities into fewer chips to get more performance, to lower power and to shrink integration cost. If it takes x microseconds to copy data from one subsystem to another and for generation 1 of a device and only x-y microseconds to copy the data between those systems in a combined part, the device manufacturer will use the combined part for generation 2, thereby reducing the isolation between those 2 subsystems. As sub-systems condense into fewer parts, they become more invisible to an analysis by a third party (i.e. the evaluator/certification) while they continue to process the exact same data that was capable of exploiting an earlier version of the system. Even if they are using battle tested standards, mobile platforms have additional proprietary features in order to differentiate from competitors or to support multiple price points for the same underlying product. This makes careful evaluation of any COTS mobile platform unique and effectively impossible without the multiple vendor's involved in the supply chain providing proprietary information. This creates a perverse incentive that prevents a user from using new commodity devices for high assurance purposes. For example, when users want to exchange a high assurance device with a newer model/device, the new model high assurance device must be reevaluated in order to certify that the new model meets the high assurance requirements. Combined with the opacity of condensed functionality, and immense amount of software, a high assurance evaluation of a commercial platform does not scale. Market forces (speed, low SWAP, time to market, cost, differentiation, etc.) continue to prevent the commercial supply chain from achieving the necessary radio isolation to deliver a high assurance off-the-shelf mobile phone that can defend against an untrusted network.

FIG. 5 illustrates a prior art approach for adapting a conventional mobile phone 70 to achieve a high assurance. The trusted processor 72 handles conversion of the trusted device data from USB input 74 and the untrusted processor 76 handles the conversion of the network data from USB input 78. An FPGA module 80 encrypts or decrypts data as it passes between input 1 and input 2. Optionally, the trusted and/or the untrusted processor interface translation functions could be added to the FPGA module 80 and the processors 72, 76 removed as discrete parts. This would increase the code in the FPGA 80 and possibly the size of the part. Nonetheless, the trust boundary is enforced between the FPGA 80 and the untrusted processor 76, much like hybrid hardware-software model of FIG. 4. However, the FPGA 80 presents power and heat problems for small form factors such as a mobile phone. And FPGA's are complex to program. Thus, once the FPGA 80 has been programmed for use in the mobile phone, its functionality cannot be easily changed. A key is placed into the device using USB input 82. Adding the key to the device via this input 82 adds cost in two ways; key protection and port protection. First, the key must be protected during generation and delivery, and the mechanism for generation and delivery of the key must be unprotected when key is brought into the device. Protecting the mechanism for generation and delivery of the key requires a non-trivial amount of key management infrastructure to maintain. Further, additional code to unwrap the key is required. Key port protection also adds cost. Additional mechanisms inside the trust boundary must ensure the key fill port 82 cannot be used to attack the device 70 since the key fill port 82 is a connection directly to the trusted side of the device. The additional complexity needed to ensure protection of the key port increases the cost to evaluate high assurance of the device. As illustrated in FIG. 5, the device 70 includes a bypass between the trusted processor 72 and the untrusted processor 76. This bypass is required in order to configure the untrusted processor. As a result, the bypass path must be carefully inspected in order to certify that the device can achieve high assurance. Thus, there remains a need to find a solution that takes advantage of the commercially available products without inheriting the vulnerability that comes with commodity hardware and software.

SUMMARY OF THE INVENTION

Briefly, the present invention provides an encrypting device including an encryption unit and a communications unit. Paired encrypting devices allow for communication of trusted data between trusted devices over an untrusted network. Data received by the encryption unit is encrypted and provided with a connectionless header for delivery to the communications unit. Data received by the communications units is provided with a complex header for delivery to the paired encrypting device. The encrypting devices may be implemented in hardware or may be virtualized on a server or a plurality of severs. Arrangement of the encrypting devices in a hub-and-spoke topology allows for communication amongst a plurality of trusted devices. The encrypting devices can be used to convert commercially available equipment suitable for high assurance environments.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 13a illustrates an implementation of the encrypting device of FIG. 7, to provide a high assurance mobile phone;

FIG. 13b illustrates a portion of the implementation of FIG. 13a in further detail;

DETAILED DESCRIPTION OF THE PREFERRED EMBODIMENT

Figure 1:
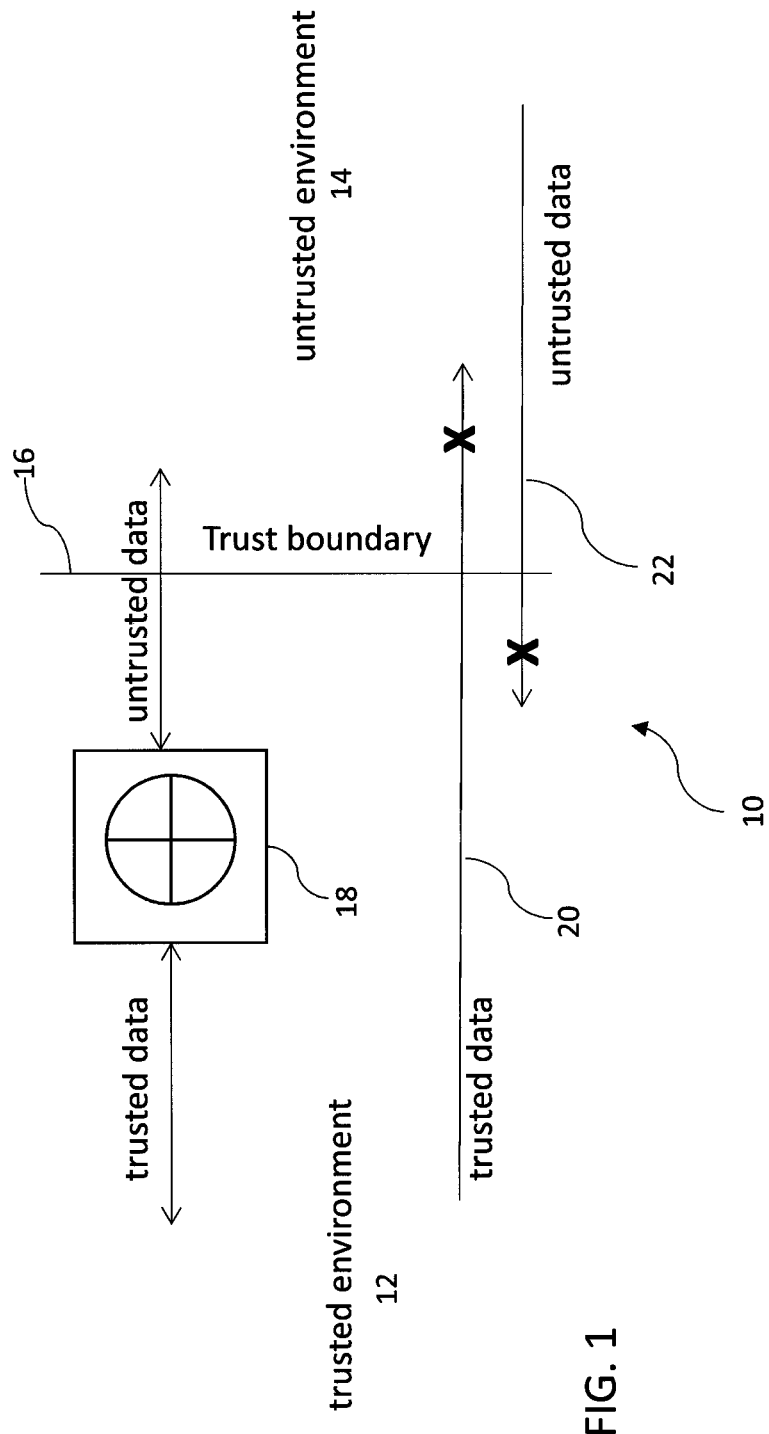
FIG. 1 illustrates use of an encryption engine to provide a trust boundary between a trusted environment and an untrusted environment.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides an encrypting device allowing for high assurance communication between trusted devices over an untrusted network. The encryption device blends the flexibility of software and the strength of hardware by using low-cost commodity hardware running commodity software. As will be described in further detail below, there is no requirement that the packets received by the encrypting device utilize a particular protocol in order for those packets to be successfully transmitted. Any Digital communication (e.g. an Ethernet frame, ATM frame, etc.) provides the essential start and stop of any packet protocol which is all that is necessary for the PFED of the present invention to send and receive packets between two points. The encrypting device receives and transmits all packets regardless of the protocol used by the trusted devices generating the packets. Thus, the encrypting device is said to be "protocol-free". The encrypting device will at times be referred to as a protocol-free encrypting device or "PFED".

Figure 6:
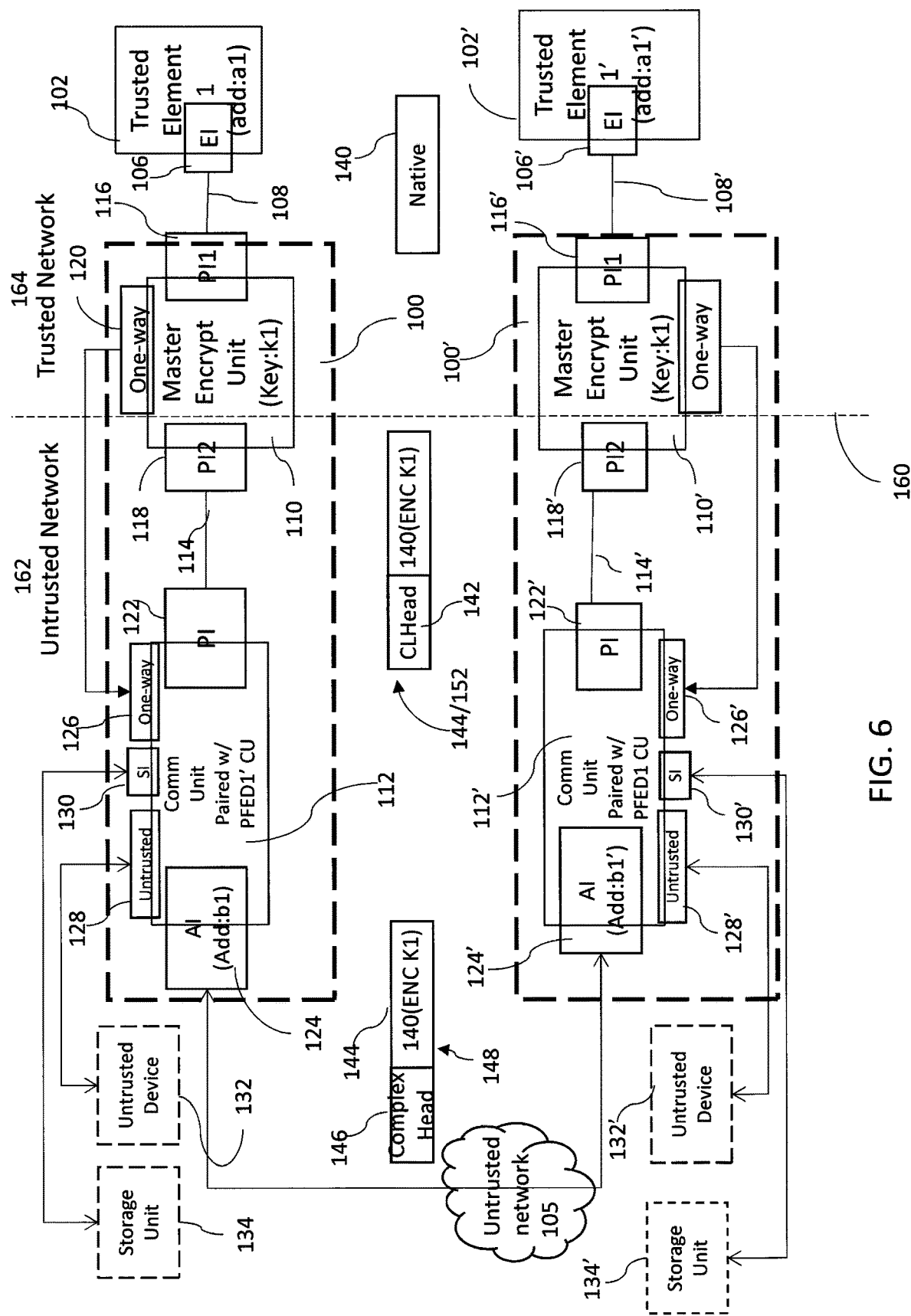
FIG. 6 illustrates an embodiment of the encrypting device of the present invention paired with another encrypting device of the present invention.

FIG. 6 illustrates a first embodiment 100 of the encrypting device of the present invention. As illustrated in FIG. 6 two encrypting devices 100, 100' are paired to provide communications between trusted element 102 and trusted element 102' via an untrusted network 105. The trusted element 102, 102' is any device in a network address space. For example, a subnet in an enterprise network is a network address space. A phone, tablet, laptop computer, desktop computer, or a router are examples of devices in a network address space.

As illustrated in FIG. 6 trusted element 102 is associated with address a1 and trusted element 102' is associated with address a1'.

The encrypting devices 100, 100' illustrated in FIG. 6 represent a hardware implementation of the encrypting device. Each trusted element 102, 102' includes an interface 106, 106' for receiving a trusted interconnect 108, 108' providing a wired connection between the encrypting device 100, 100' and the trusted element 102, 102', thereby providing high assurance communications between the trusted element 102, 102' and the encrypting device 100, 100'. Encrypting device 100 is associated with trusted element 102 via a trusted interconnect 108 and encrypting device 100' is associated with trusted element 102' via a trusted interconnect 108'. In order for communication to occur between trusted element 102 and trusted element 102', encrypting device 100 and encrypting device 100' must be paired, as will be discussed in further detail below.

Each sending trusted element 102, 102' generates native packets 110 to be received by another trusted element 102, 102'. These native packets can take any form that would normally travel between the trusted elements as if the encrypting devices 100, 100' were not utilized. For example, an IP packet riding in an Ethernet frame.

As illustrated in FIG. 6, each encrypting device 100, 100' generally includes a master encryption unit 110, 110' and a communications unit 112, 112'. Encrypting device 100 and encrypting device 100' are identical and operate in the same manner, therefore it is to be understood that description of encrypting device 100 applies to encrypting device 100' as well. The master encryption unit 110 and the communications unit 112 are linked via a connectionless interconnect 114 provided by a bus. The connectionless interconnect 114 utilizes a point-to-point connectionless protocol for the transmission of messages between the master encryption unit 110 and the communications unit 112). This point-to-point connectionless interconnect simply sends messages between the encryption unit 110 and the communications unit 112. No arrangement is made between the encryption unit 110 and the communications unit 112 prior to messages being sent; e.g., the sending unit does not perform a "handshake" to ensure the receiving unit is prepared to receive a message.

Each master encryption unit 110, 110' is configured with a key for encrypting and decrypting messages. In order for trusted element 102 to communicate with trusted element 102', the master encryption unit keys of encrypting device 100 and encrypting device 100' must match. The master encryption units of encrypting device 100 and encrypting device 100' are keyed with encryption key k1.

The master encryption unit 110 includes first and second passive interfaces 116, 118 and a one-way interface 120. Each passive interface 116, 118 of the master encryption unit 110 may be, for example, an Ethernet port, a serial port, or a USB port. The first passive interface 116 of the master encryption unit 110 is in communication with the trusted element interface 106 of trusted element 102 via the trusted interconnect 108, e.g. an Ethernet cable, a serial wire, or a USB cable. The first and second passive interfaces 116, 118 are not associated with an address. In addition, each passive interface is "promiscuous"; i.e., any messages received by the master encryption unit 110 at the passive interface 116 are processed by the master encryption unit 110. The passive interface 116 is not addressable and therefore, the messages are treated strictly as data, not as network packets prior to processing by the master encryption unit 110.

The one-way interface 120 of the master encryption unit may be, for example a GPIO pin, or the tx side of a twisted pair serial wire, etc. The one-way interface 120 allows for instructions generated by the master encryption unit 110 to be signaled to the communications unit 112. For example the master encryption unit 110 may provide an instruction to the communications unit 112 instructing the communications unit 112 to halt operations.

Each communications unit 112 includes a passive interface 122 and an active/addressable interface 124. The passive interface 122 of the communications unit 112 of encrypting device 100 is in communication with the second passive interface 118 of the master encryption unit 110 of encrypting device 100 via the connectionless interconnection 114. The active/addressable interface 124 of the communications unit 112 is associated with an address. As illustrated in FIG. 6, the active interface 124 of the communications unit of encrypting device 100 is associated with address b1 and the active interface 124' of the communications unit of encrypting device 100' is associated with address b1'. The communications unit of encrypting device 102 is paired with the communications unit of encrypting device 102'. The communications unit of encrypting device 102 and 102' are configured to communicate any packets from the passive interface into a form that will be routable to the other communication unit of the paired PFED. As a result of this pairing, all communications sent by the communications unit 112 of encrypting device 100 will include a source address b1 and a destination address b1' and all communications sent by the communications unit 112' of encrypting device 100' will include a source address b1' and a destination address b1. Communications between the communications units 112, 112' occur over the untrusted network 105. The untrusted network 105 may be for example, the Internet, or an enterprise network.

Each communication unit 112 also includes a one-way interface 126 for receiving one-way communications from the master encryption unit 110. As described above, these one-way communications may include for example an instruction to halt operations.

Optionally, each communication unit 112 also includes an untrusted device interface 128 and/or a storage interface 130. The untrusted device interface 128 provides for communication between the communications unit 112 and an untrusted device 132. This interface 128 is used to configure the communication unit 112. Typically, a webserver will present to the browser on the untrusted device 133 configuration options such as the address b1' of the communication unit 112' of the paired encrypting device 100'. Additionally the untrusted device interface 128 will act as a hotspot access point and provide NAT (network address translation) for the untrusted device 132 to use the untrusted network 105. This has an additional advantage for the case of captive portals such as those found in hotels or coffee shops. Captive portals typically authenticate the address of the connecting device and since the encrypting device 100 never allows the trusted element 102 to communicate directly with the untrusted network 105, the untrusted device 132 can act as a proxy to enter the credentials required by the captive portal.

The storage unit interface 130 provides for communications between the communication unit 112 and a storage device 134, such as for example a blue tooth dongle or a USB device. The storage device could be, for example, a wallet to contain a key split. It could serve as a geo fence or tether where if the presence of the storage device was not detected, the encryption unit could stop. The communication unit routes the data between the storage device and the encryption unit isolation boundary in similar fashion as data from the untrusted network is sent to the encryption unit.

A description of communication from trusted element 102 to trusted element 102' is described herein with the understanding that communications from trusted element 102' to trusted element 102 occur in a similar manner. Trusted element 102 generates a native packet 140 for delivery to trusted element 102'. The native packet 140 can be, for example, an Ethernet frame and may include a frame header identifying the source address a1 and destination address a1'. The native packet 140 is delivered to master encryption unit 110 of encrypting device 100 via the trusted interconnect 108 and the first passive interface 116 of the master encryption unit 110. When the native packet 140 is received by the master encryption unit 110, the master encryption unit 110 ingests the entire native pack 140 (including the frame header and the payload) and encrypts the entire native packet 140 using encryption key k1. Master encryption unit 110 also adds a connectionless header 142 to the encrypted native packet 140 to form an outgoing connectionless datagram 144. The connectionless datagram 144 is an atomic, stateless datagram.

The connectionless header 142 may include fields identifying message boundaries (e.g. length) or other static properties of the message. The receiver is free to accept or reject a frame independent of the contents of the connectionless datagram 144 using pre-specified criteria associated with the fields of the connectionless header 142. For example, the connectionless header 142 may include fields such as for example, length. The length field may be bound by a pre-specified constant defining the maximum length of the frame that the receiver (i.e. the master encryption unit 110 or the communications unit 112) will accept. If the length of the connectionless datagram 142 exceeds the pre-specified maximum length as determined by the receiver, the receiver (110/112) may safely discard the connectionless datagram 142. Because no dynamic properties are included in the connectionless header 142, the receiver 110/112 can process a frame without maintaining any previous state information. As a result, the logic and state machine required of the receiver 110/112 to accurately process the connectionless header 142 is greatly simplified. Every state can be humanly inspected to a known termination. This significantly improves the ability to evaluate the security boundary logic for the purpose of certification and correctness.

The outgoing connectionless datagram 144 is delivered from the master encryption unit 110 to the communications unit 112 via the second passive interface 118 of the master encryption unit 110, the connectionless interconnect 114, and the passive interface 122 of the communications unit 112. Upon receipt, the communications unit 112 adds a complex header 146 to the encrypted packet 140 form a packet 148. The complex header 146 is understood by the untrusted network 105 and allows for delivery of the packet 148 to the paired communications unit 112'. For example, the complex header 146 includes source address b1 and a destination address b1'. The complex header may also include dynamically defined fields.

The untrusted network 105 routes the packet 148 as required to achieve delivery of the packet 148 to the paired communication unit (i.e., the communications unit 112' of encrypting device 100'). Upon receipt of the packet 148, the communications unit of encrypting device 100', removes the complex header 146 added by the communications unit 112 and adds a connectionless header 150 to the connectionless datagram to form an incoming connectionless datagram 152. As described above, the connectionless header 150 may include fields identifying message boundaries (e.g. length) or other static properties of the message. The incoming connectionless datagram 152 is transmitted from the communications unit 112' to the master encryption unit 110' of encrypting device 100'.

The master encryption unit 110' of encrypting device 100' receives the incoming connectionless datagram 152, decrypts the encrypted native packet 140 and delivers the decrypted native packet 140 to trusted element 102'.

From the perspective of trusted element 102 and 102', trusted elements 102 and 102' are unaware of the presence of encrypting device 100 and encrypting device 100'. Trusted elements 102 and 102' behave as if they are directly communicating with each other at the ISO OSI layer 2 level and above; i.e., trusted devices 102 and 102' communicate via the untrusted network 105 as if encrypting device 100 and encrypting device 100' were not included in the communications path. Each encrypting device pair 100-100' provides a cryptographically-paired, point-to-point link enforcing logical and physical isolation to provide a trust boundary 160 between the untrusted environment 162 and the trusted environment 164. The physical isolation is accomplished by providing independent devices at the endpoints of the connectionless interconnect 114 (i.e. at the master encryption unit 110 and at the communications unit 112). The complex native untrusted network processing is done on the communications unit 112 separate from the simple connectionless network processing done by the master encryption unit 110. The logical isolation is accomplished by the transformation of the untrusted native packet 140 sent to active/addressable interface into a connectionless packet 144. The native packet 140 is always encrypted before it passes from the trusted element 102 to the communications unit 112 and is cryptographically authenticated by master encryption unit 110' of the paired encrypting device 100' before it is allowed to pass to the trusted element 102'. Because all packets arriving at the trusted element 102' must be received via the master encryption unit 110', an entity located on the communication unit 112' side of the connectionless-interconnect 114' cannot manufacture a packet 148 that has meaning to the trusted element 102' unless the key (k1) is known to that entity. Preferably, an entity located on the untrusted network (i.e., on the communications unit 112' side of the connectionless-interconnect 114') cannot manufacture and deliver a connectionless datagram 152 to the encryption unit 110'. In order to deliver a connectionless datagram 152 that did not originate from the paired encrypting device 100, a failure must occur on the communication unit 112'. Thus, the communications unit 112' is acting as a crumple zone. A encrypting device pair 100-100' is in effect a virtual wire connecting two devices 102, 102' in trusted spaces via a tunnel through untrusted spaces, i.e., the encrypting device pair 100-100' creates a tunnel across the untrusted network 105. The trusted and untrusted environments 162, 164 are completely isolated from each other. No knowledge about the other is shared. This is what is meant by "protocol-free". The encryption and networking are independent "protocols". Although the point-to-point link is restrictive from a sophisticated network topology point of view, it avoids any requirement to perform routing within the cryptography, thus there is no need to create a bypass between the trusted and untrusted environments. In effect, each encrypting device is doing blind routing to deliver the trusted element plaintext native packet 140 across the untrusted network 105.

As illustrated in FIG. 6, the master encryption units 110, 110' are configured to transmit inter-PFED control messages 170 in order to manage themselves. These inter-PFED control messages 170 are used, for example, to manage the cryptographic state of the encryption units 110, 110'. For example, the master encryption unit 110 of PFED 100 can generate an inter-PFED control message 170 for delivery to the master encryption unit 110' of PFED 100' to rekey, manage the cryptographic algorithm, manage the status of the encryption units (e.g., log, online/offline, etc.), or begin a new session, etc. These inter-PFED control messages 170 are originated at the master encryption unit 110, are encrypted by the master encryption unit 110 using key K1, packetized as connectionless packets and travel along the same PFED-to-PFED' tunnel as the native packets 140 originating at the trusted element 102 but are tagged as control messages. Because the inter-PFED control messages 170 are tagged as control message, they are not sent to the trusted element 102'.

Figure 2:
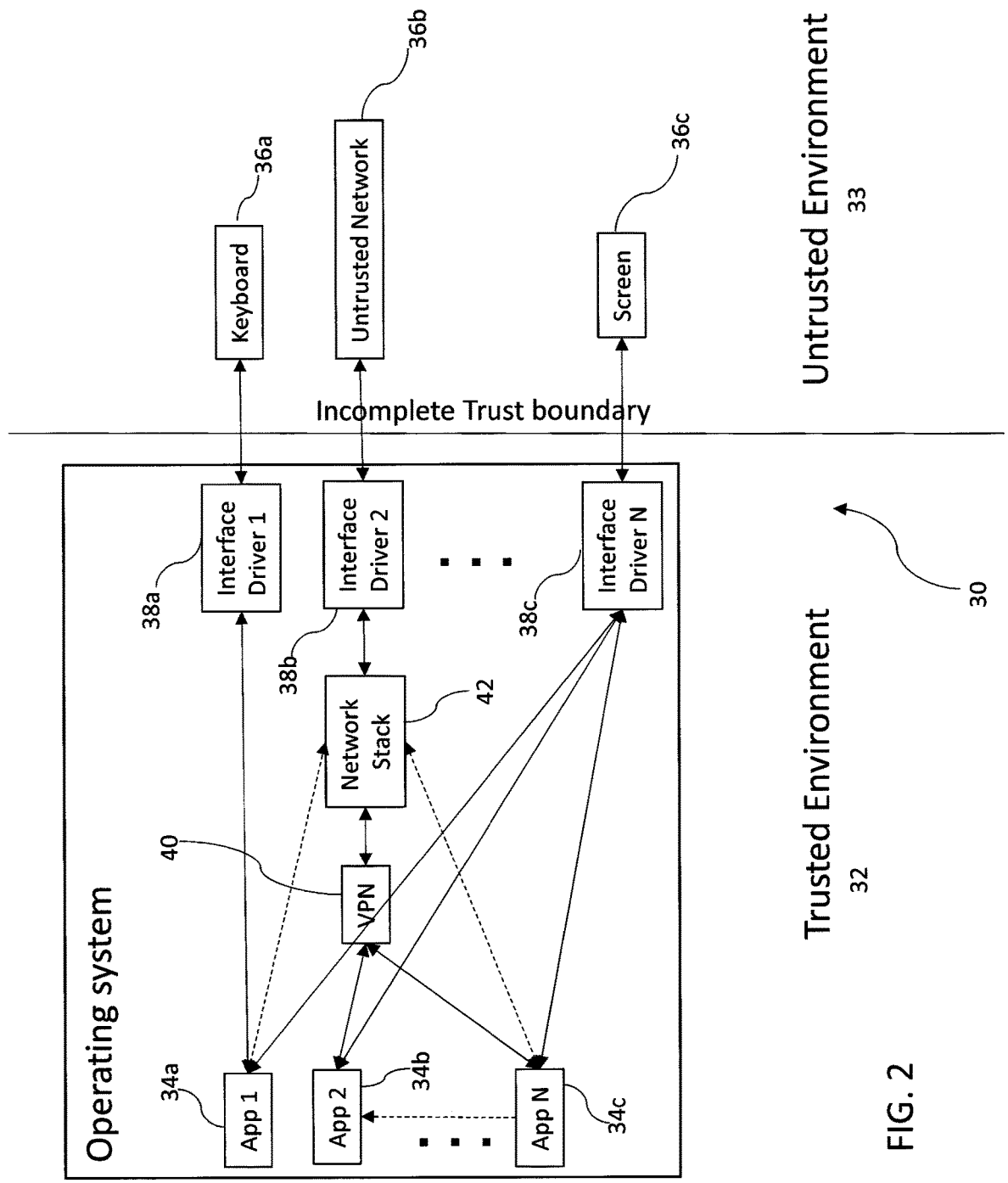
FIG. 2 illustrates a software-based encryption model using a VPN as the encryption engine to provide a trust boundary.
Figure 3:
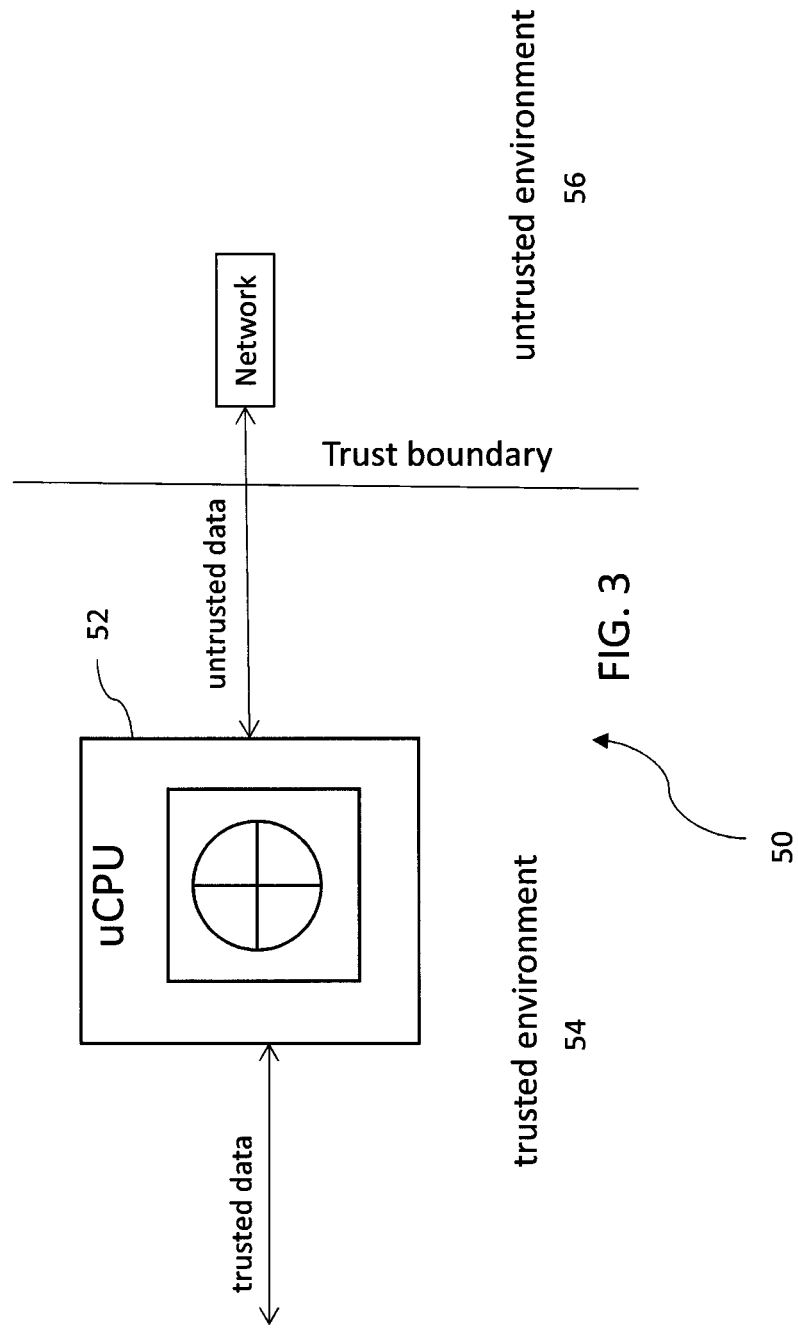
FIG. 3 illustrates a dedicated hardware-based model using a microprocessor as the encryption engine to provide a trust boundary.
Figure 4:
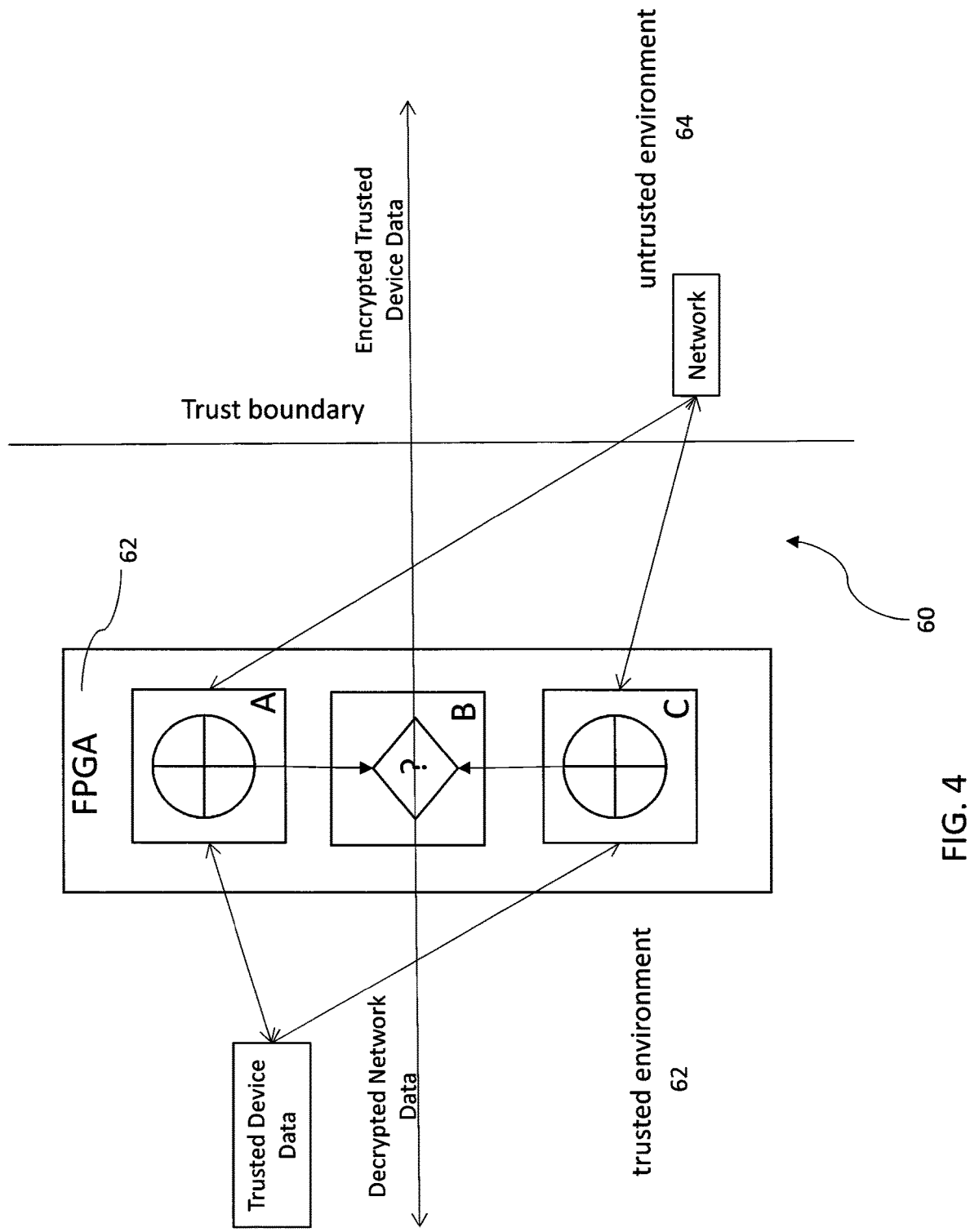
FIG. 4 illustrates a hybrid hardware-software model using an FPGA to provide a trust boundary.
Figure 5:
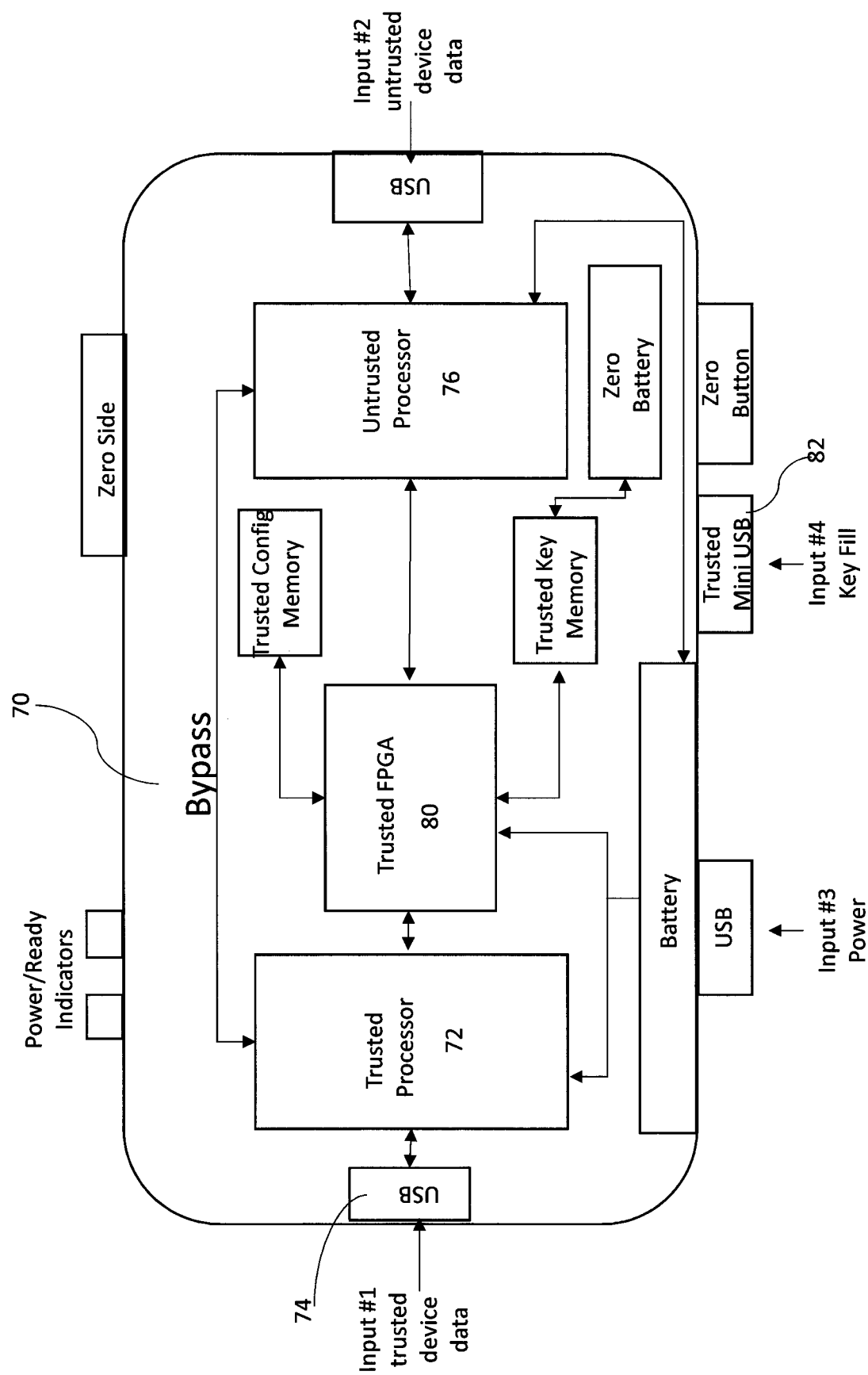
FIG. 5 illustrates a prior art approach to adapting a mobile phone to achieve a trust boundary.
Figure 6A:
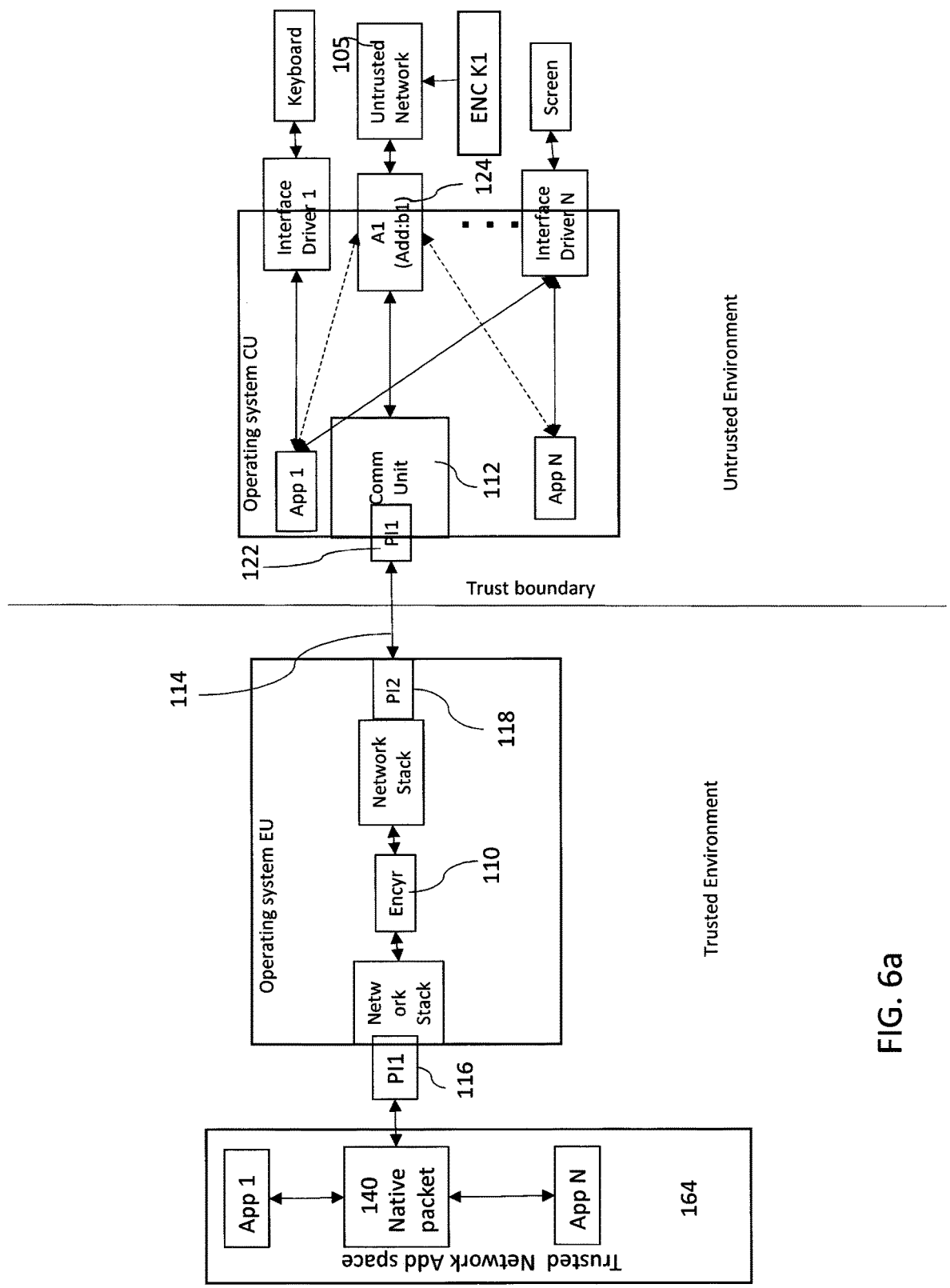
FIG. 6a illustrates use of the device of FIG. 6 to achieve separation of vulnerable software in the untrusted environment from the trusted device.

FIG. 6a provides a comparison of the "incomplete trust boundary" created by the model illustrated in FIG. 2 and the trust boundary provided by the present invention illustrated in FIG. 6. As illustrated, native packets 140 are generated by applications in a trusted network address space 164 and provided to the passive interface 116 of the encryption unit 110. After encryption by the encryption unit 110, the encrypted packet is provided to the passive interface 118 of the encryption unit 110 and on to a single passive interface 122 of the communications unit 112 via the connectionless interconnect 114. The communications unit 112 adds a complex header to the encrypted packet for delivery via the untrusted network 105. As further illustrated in FIG. 6a, encrypted packets 148 arrive at the addressable interface (add: b1) 124 from the untrusted network 105 for delivery to the trusted network address space 164 of the trusted environment. The encrypted packet 148 is received with a complex header which is removed from the packet by the communications unit 112 and a connectionless header is added to translate the encrypted packet to the passive interface 122 of the communications unit 112 and on to passive interface 118 of the encryption unit 110 via the connectionless interconnect 114. As illustrated by the dashed lines in FIG. 6a, an adversary could take advantage of additional applications on the operating system of the communications unit 112 to deliver packets to the addressable interface 124 and those packet will be delivered to the passive interface 118 of the encryption unit. Because the packets delivered to the interface 124 via these unintended pathways were not encrypted with encryption key k1, upon receipt of the packets by encryption unit 110, decryption of the packets will by unsuccessful. In addition, because encryption unit 110 is configured to accept only packets of a singular type (i.e., PFED-type) all other packets can easily be dropped.

Figure 7:
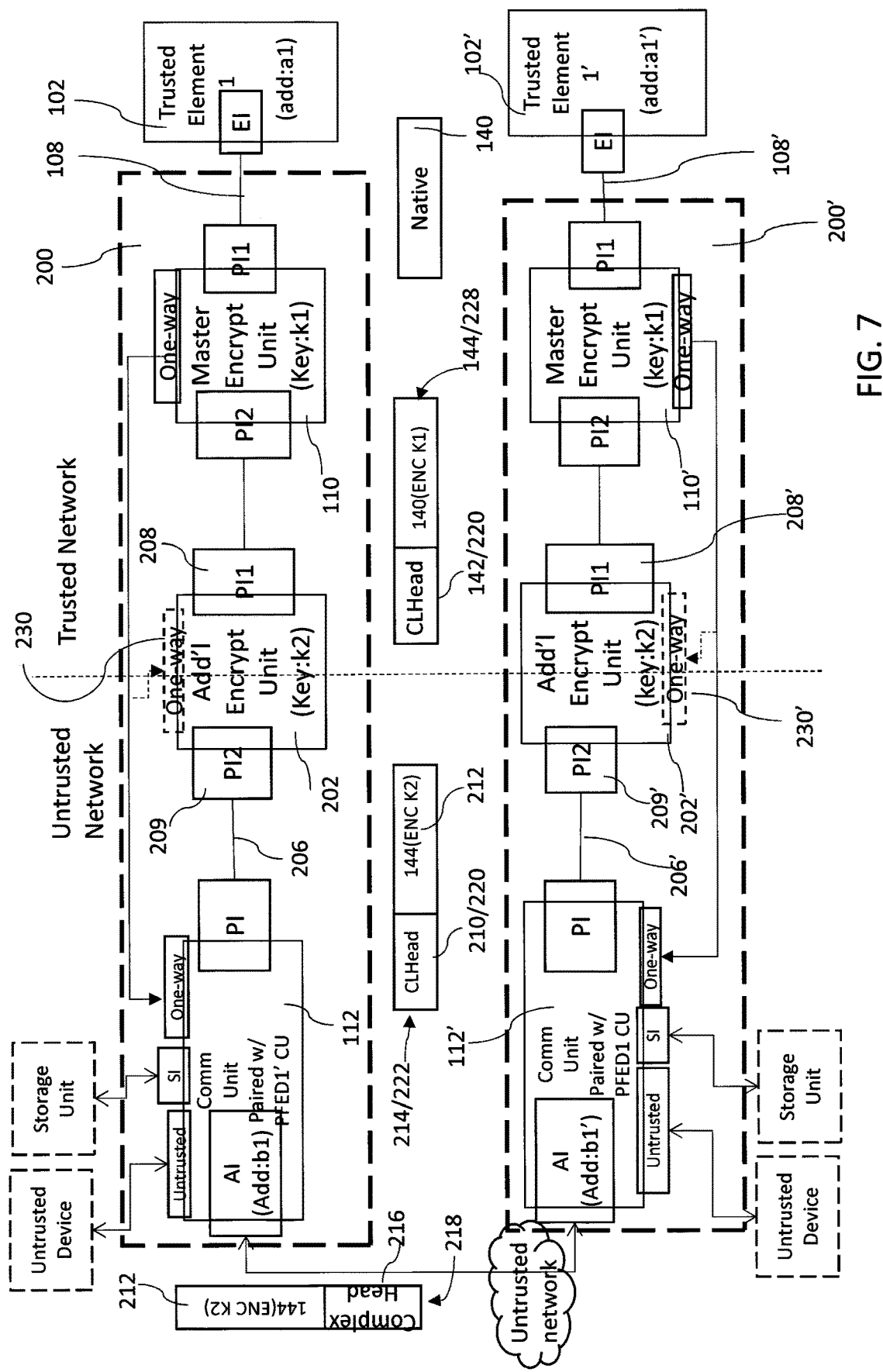
FIG. 7 illustrates an embodiment of the encrypting device of the present invention paired with another encrypting device of the present invention, wherein each encrypting device includes an additional encryption unit.

FIG. 7 illustrates an alternative embodiment 200 of the PFED of the present invention. As illustrated in FIG. 7, two PFEDs 200, 200' are paired to provide communications between trusted element 102 and trusted element 102' via an untrusted network 105. Each PFED 200, 200' illustrated in FIG. 7 is similar to the PFED 100 described in connection with FIG. 6, however each PFED 200, 200' includes an additional encryption unit 202, 202' to provide a second layer of encryption. The additional encryption unit 202, 202' of each PFED is in communication with the master encryption unit 110, 110' via a connectionless interconnect 204, 204' and is in communication with the communications unit 112, 112' via a connectionless interconnect 206, 206'. Each additional encryption unit 202, 202' include a first passive interface 208, 208' and a second passive interface 209, 209'. The additional encryption units 202, 202' encrypt and decrypt messages using key K2. The PFEDs 200, 200' illustrated in FIG. 7 operate in the same manner as the PFEDs 100, 100' illustrated in FIG. 6 with the following exceptions. The outgoing connectionless datagram 144 generated by master encryption unit 110 including the encrypted native packed 140 and the connectionless header 142 is received by the additional encryption unit 202 prior to transmission to the communications units 112. More specifically, the outgoing connectionless datagram 144 generated by the master encryption unit 110 is received at the first passive interface 208 of the additional encryption unit 202 and the additional encryption unit 202 identifies a payload for encryption. The payload to be encrypted includes the encrypted native packet 140 and may include the connectionless header 142 added by the master encryption unit 110. The additional encryption unit 202 encrypts the payload using key K2 and adds a connectionless header 210 to the encrypted payload 212 to form an outgoing connectionless datagram 214.

The communications unit 112 of the PFEDs 200, 200' illustrated in FIG. 7 receives the connectionless datagram 214 formed by the additional encryption unit 202 and operates in the same manner as the communications units 112 described in connection with FIG. 6, i.e., the communications unit 112 of PFED 200 receives the outgoing connectionless datagram 214 from the additional encryption unit 202, and adds a complex header 216 to form a packet 218 appropriate to be delivered to the paired communications unit 112' of the paired encrypting device. Upon receipt of the packet 218 including the encrypted payload 212, the communications unit 112' of PFED 200', removes the complex header 216 added by the communications unit 112 of PFED 200 and adds a connectionless header 220 to form an incoming connectionless datagram 222.

The additional encryption unit 202' of PFED 200' receives the incoming connectionless datagram 222 including the encrypted payload 212 at the second passive interface 209' of the additional encryption unit 202' and decrypts the encrypted payload 212 using key k2. A connectionless header 226 is added to the decrypted payload (including the encrypted datagram 140) to form an incoming connectionless datagram 228. The master encryption unit 110' of PFED 200' receives the incoming connectionless datagram 228 and decrypts the encrypted native packet 140 using key k1, and delivers the decrypted native packet to trusted element 102'.

As illustrated in FIG. 7, the combination of the master encryption unit 110 and the additional encryption 202 unit enables layering of the encryption while continuing to enforce logical and physical isolation at the trust boundary.

When the PFEDs 200, 200' illustrated in FIG. 7 are paired, they provide higher assurance communications between the trusted elements 102, 102' for a given use case. The tunneling of the master encryption unit 110 with the additional encryption unit 202 illustrates how one can increase the assurance by providing two independent layers of encryption. The key is they are independent, the encryption of each encryption unit 110, 202 is performed by completely separate hardware within the trusted portion of the environment and behind the trust boundary. As illustrated, the first encryption unit 110 can be a master of second encryption unit 202 where the behavior of the additional encryption unit 202 is solely managed by intra-PFED commands between the additional encryption unit 202 and the master encryption unit 110 (e.g., turn on, turn off, update key, zeroize, etc.).

The additional encryption unit 202 does nothing more than encrypt or decrypt messages received on either interface 208, 209. Alternatively, the additional encryption unit 202 can behave as another autonomous encryption unit (i.e., another master encryption unit 110). The connectionless datagram within the PFED 200 makes the tunneling transparent for either configuration.

The layering of the cryptography and the hardware-like nature of the architecture creates a crumple zone where multiple failures must occur before malicious traffic can make it to the cryptographic processing (i.e. the encryption units 110, 202), or the trusted element 102, 102'). Likewise, multiple failures must occur for sensitive data to leak from the trusted element 102, 102' to the untrusted network 105.

One dimension of this crumple-zone/protocol-break is that the untrusted network 105 transport changes at the electrical/link layer when it arrives at the communications unit 112, 112'. The untrusted network 105 terminates at the communications unit 112, 112'. It does not proceed logically or physically into the connectionless interconnect 206, 206'. There must be an explicit conversion between the untrusted network frames of the packet 218 received by the communications unit 112, 112' and the frames of the connectionless packet 214, 222 provided at the connectionless interconnect 206, 206'. A conversion likely won't be accidental. Use of the connectionless interconnect 206, 206' between the communications unit 112, 112' and the encryption unit 202, 202' prevents the adversary from maliciously influencing the trusted boundary provided at the encryption unit from a remote location on the untrusted network 105. Any attempt to breach the trusted boundary, therefore requires exploitation of the communications unit 112, 112'. It is conceded that exploitation of the communications unit 112, 112' is possible and perhaps likely given that the communications unit 112, 112' is likely running a general purpose operating system and these operating systems have historically been exploitable. Assuming the adversary has successfully exploited the communication unit 112, 112', the adversary will now be able to create malicious frames for delivery to the additional encryption unit 202, 202' via the connectionless interconnect 206, 206'. The malicious frames might trigger a bug in the frame handling logic in the additional encryption unit 202, 202'. But a much stronger enforcement mechanism is provided by the fact that we've dictated what is an unacceptable frame (i.e. an unacceptable frame is anything but our singular connectionless protocol type). As noted above, the connectionless interconnect protocol requires that the connectionless header associated with each connectionless datagram identifies the frame type of the connectionless datagram (e.g. frame type="PFED-type"). If a header associated with frames at the connectionless interconnect includes any value other than "PFED-type", the frames can be safely discarded by the network stack of the receiving encryption unit. For example, if the connectionless interconnect 206 is an Ethernet bus, there are 65K 802.11 valid frame types which may be supported by an Ethernet bus. Typically Ethernet frames will be typed as an internet protocol (IP), an address resolution protocol (ARP) or any number of link level protocols. However, our connectionless protocol is using a non-standard Ethernet frame type (e.g. "PFED-type"). This non-standard frame type won't be understood by an off-the-shelf operating system network stack but is passively received by the passive interfaces. In addition, if we install a filter (e.g. Berkeley packet filter) at the bottom of the network stack on the encryption unit 202, 202', then immediately after the packet leaves the passive network interface but before it is processed by the rest of the network stack or anywhere else, then we can further accurately and easily reject any packet 222 that does not have a PFED frame type. Rejection of any frame will not pose much danger to the trusted elements 102, 102' because the trusted elements 102, 102' are operating above the PFED network level and have been built to absorb and react to loss of packets.

Furthering the crumple zone, the encrypted payload is mechanistically parsed by the decryption algorithm provided by the additional encryption unit 206, 206'. There's not much ambiguity to the mechanistic parsing. The decryption algorithm can also include a mechanistic integrity check. Thus, it is very feasible to create and verify a fail-closed logic such that exploiting the frame processing mechanism is not viable since all error conditions have a termination. This ultimately means the only correct frame that can be forged is one created by knowing the key, and correctly enumerating the framing fields.

The following examples, demonstrate how multiple failures are required before any breach of the trust boundary created by the PFED 200 could occur.

In a first example, assume the key K2 for additional encryption unit 202, 202' is not known. Any maliciously crafted data intended for master encryption unit 110, 110' must go through the additional encryption unit 202, 202'. Because the additional encryption key K2 was not known, additional encryption unit 202, 202' the additional encryption unit 202, 202' will unpredictably transform the data into random data before it's sent to the master encryption unit 110, 110'. Preferably, the algorithm in the additional encryption unit 202, 202' performs cryptographic authentication and drops the packet. If the malicious input has an adverse effect on, the master encryption unit 110, 110', it will be difficult, if not impossible to detect or control from the communications unit 112, 112' because of the physical and logical separation. The adversary will be shooting in the dark from there. The normally vulnerable software on the master encryption unit 110, 110' is protected from exploitation while the key for the additional encryption unit 202, 202' remains unknown. Also the cryptographic authentication by the master encryption unit 110, 110' will discard any frame with even a single incorrect bit. Thus, frames provided by the random data generated by the additional encryption unit 202, 202' without the encryption key K2, should be discarded. Learning K2 requires at least another failure.

In another example, assume the key for additional encryption unit 202, 202' is known. In order to break the trust boundary, the adversary still needs to know the key for the master encryption unit 110, 110' for the same reasons he needed it for the additional encryption unit 202, 202'. Getting malicious data to master encryption unit 110, 110' does not immediately lead to the untrusted data reaching the trusted element 102, 102'. The framing protocol for the connectionless interconnection 204, 204' provided between the master 110, 110' and additional encryption units 202, 202' is similarly stateless like connectionless interconnect 206, 206' between the additional encryption unit 202, 202' and the communications unit 112, 112'. Parsing the frame is the first thing the master encryption unit 110, 110' does when data arrives on connectionless interconnect 204, 204'. The master encryption unit 110, 110' will not be vulnerable to a frame parsing bug for the same reason the additional encryption unit 202, 202' is not vulnerable. The master encryption unit 110, 110' can also safely cryptographically authenticate the frame and discard a malicious arbitrary frame. Like the additional encryption unit 202, 202', this ultimately means the only correct frame that can be forged is one created by knowing the key, K1. Learning key K1 requires another failure. Thus, getting untrusted and possibly malicious data from the communications unit 112 to the trusted element 102 requires multiple non-trivial failures.

The following is an example of an attack which is not defeated by the PFED 100, 200. assume the adversary gains access to trusted element 102, 102' in order to inject malicious data into the master encryption unit 110, 110'. There is no way to send data at the master encryption unit 110, 110' (or the additional encryption unit 202, 202'). The interface at the trusted interconnect 108, 108' is promiscuous. It has no address. Any data frame electrically received at the trusted interconnect 108, 108' is blindly consumed, encrypted by the master encryption unit 110, 110' and passed on. That data ultimately exits encrypted at the connectionless interconnect 206, 206' between the additional encryption 202, 202' unit and the communications unit 112, 112' and is sent on by the communications unit 112, 112'. This is no different than if the attacker was legitimately sending data from the trusted device 102, 102'102. The effect will be to attack the trusted element 102, 102' on the other end. Thus a PFED will not protect an enterprise against malicious trusted devices unless it were to become more active inspecting the frames at the trusted interconnect, much like an intrusion detection system. Although the PFED 100, 200 cannot stop such an attack from a malicious insider, the cryptographic engine remains intact.

The master encryption unit 110, 110' can perform encryption similar to the encryption provided by the VPN of the software-based encryption model illustrated in FIG. 2, without incurring the vulnerability of memory corruption exploitation that normally befalls that model. Unlike the VPN 40 of the software-based model 30, there is no interface on the master encryption unit 110, 110' that can be directly reached from any untrusted location. There is only one way in and one way out of the master encryption unit 110, 110'. As long as the path in and out of each the master encryption unit 110, 110' use a connectionless protocol, accidental or malicious entry or escape of sensitive data is prevented.

As illustrated in FIG. 7, in addition to providing a one-way connection between the master encryption unit 110, 110' and the communications unit 112, 112', the additional encryption unit 110, 110' also includes an optional one-way interface 230, 230' for providing a one-way connection between the master encryption unit 110, 110' and the additional encryption unit(s) 202, 202'. Instructions which may be provided between the master encryption unit 110, 110' and the additional encryption unit(s) 202, 202' using this one-way interface 230, 230' include for example, an instruction to perform a power cycle, or any kind of instruction that doesn't require a two-way conversation and might be an emergency path where the existing interconnect is not relevant for some reason.

Figure 8:
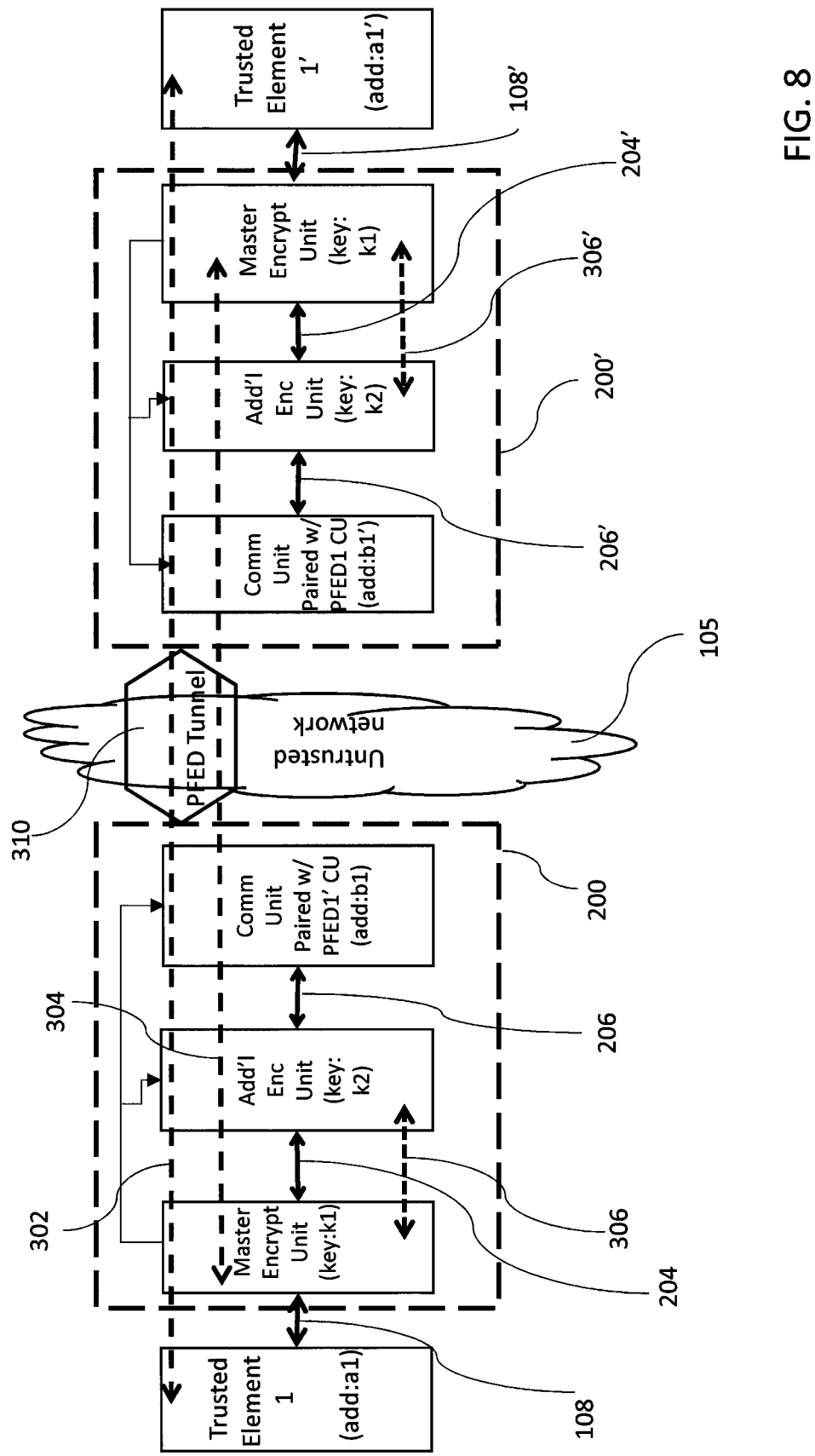
FIG. 8 illustrates the interconnects provided by the encrypting devices of FIG. 7 along with the communication paths provided by the devices.

FIG. 8 provides an illustration of the various interconnects provided by the PFED 200. A trusted element interconnect 108, 108' provides connection between the trusted element 102, 102' and the master encryption unit 110, 110'. In the event the master encryption unit 110, 110' is the only encryption unit, a connectionless interconnect provides a connection between the master encryption unit 110, 110' and the communications unit 112, 112'. In the event a master encryption unit 110, 110' and an additional encryption unit 202, 202' are provided by the PFED (as illustrated in FIG. 8), a connectionless interconnect 204, 204' is provided between the master encryption unit 110, 110' and a connectionless interconnect 206, 206' is provided between the additional encryption unit 202, 202' and the communications unit 112, 112'.

Various communications paths provided by the paired PFEDs 200, 200' are also illustrated in FIG. 8, including a traffic communication path 302, an inter-PFED communication path 304, and an intra-PFED communication paths 306, 306'.

As illustrated in FIG. 8, the endpoints of the traffic communication path 302 are provided by the first and second trusted elements 102, 102' and messages carried on this path are generally referred to as the "traffic" between the trusted elements 102, 102'. The traffic is processed by the master encryption units 110, 110', any additional encryption units 202, 202' and the communications units 112, 112'.

The endpoints of the inter-PFED communication path 304 are provided by the paired master encryption units 110, 110' and messages carried on this path 304 are referred to as inter-PFED control messages. The inter-PFED control messages generated by the master encryption units 110, 110' are processed by the additional encryption units 202, 202', and the communications units 112, 112'. Any inter-PFED control messages originating from the master encryption unit 110, 110' are labeled as a control frame. More specifically, for example, an inter-PFED control message may be created by encryption unit 110 of PFED 200, encrypted by the master encryption unit 110, using key K1, and a connectionless header is added. The inter-PFED control message is then communicated to the additional encryption unit 202, via the connectionless interconnect 204. The additional encryption unit 202 then further encrypts the inter-PFED control messages, using key K2, and adds a connectionless header to route the inter-PFED control messages to the communications unit 112 via the connectionless interconnect 206. The communications unit 112 applies a complex header to the inter-PFED control message allowing inter-PFED control messages to be delivered to the communications unit 112' of the paired PFED 200'. Upon receipt of the inter-PFED control message, the communications unit 112' removes the complex header, adds a connectionless header and delivers the inter-PFED control message to the additional encryption unit 202' via connectionless interconnect 206'. The additional encryption unit 202' decrypts the inter-PFED control message using key k2, adds a connectionless header and delivers the decrypted inter-PFED control message to the master encryption unit 110' via connectionless interconnect 204'. The master encryption unit 110' receives the inter-PFED control message and decrypts the inter-PFED control message using key K1 to provide the appropriate instructions to the master encryption unit 110'. It is noted that the inter-PFED control messages are not forwarded to the trusted device 102'.

The inter-PFED control messages provided by the master encryption unit allow for sophisticated operations beyond encryption. Because a PFED 200 is only active with its paired PFED 200' (i.e. may only communicate with its paired PFED), traditional key management by a trusted administrator is no longer necessary. The inter-PFED control messages allow paired PFED's to autonomously manage themselves by sending commands back and forth over the inter-PFED communications path 304. For example, the inter-PFED control messages can rekey the PFED pair 200-202', zeroize a paired PFED, provision new keys, recover from key desynchronization, download the log, send a patch, etc. These operations can be performed safely by pre-sharing an initial key for the pair 200-200'. There is no need to physically do anything beyond an initial pre-sharing of a key in order to begin the autonomous cryptographic lifecycle. The inter-PFED communications path 304 can be provisioned and managed completely by inter-PFED control messages. Authentication of a peer (i.e. a paired PFED) is automatic because the key K1 is unique to paired PFEDs 200 and 200'. Thus, if PFED 200' is able to successfully decrypt the messages it receives, it is understood that the source of the messages must be PFED 200. Likewise, if PFED 200 is able to successfully decrypt the messages it receives, it is understood that the source of the messages must be PFED 200'.

Although the traffic and the inter-PFED control messages are routed between PFED 200 and PFED 200' via the internet, because all messages sent by the communication unit 112 of PFED 200 will only be delivered to the communications unit 112' of PFED 200' and all messages sent by the communication unit 112' of PFED 200' will only be delivered to the communications unit 112 of PFED 200, the untrusted network 105 is described as providing a PFED tunnel 310 for transporting these messages. The PFED tunnel 310 is illustrated in FIG. 8.

As also illustrated in FIG. 8, the endpoints of the intra-PFED communication paths 306, 306' are provided by the master encryption unit 110, 110' and the additional encryption unit 202, 202' of a PFED 200, 200' and messages carried on this path 306, 306' are referred to as intra-PFED control messages. These intra-PFED messages are communicated to the additional encryption unit 202, 202' but are not transmitted to the communications units 112, 112'. The intra-PFED control messages never leave the PFED 200, 200'. These intra-PFED control messages allow the master encryption unit 110 to manage the additional encryption unit 202 and master encryption unit 110' to manage the additional encryption unit 202' by providing commands such as, for example, start, stop, restart, use this key, install new software, etc.

FIGS. 6-8 each illustrate a pair of PFEDs providing point-to-point connection paths allowing transmission of messages between paired trusted devices. It is to be understood that any number of these point-to-point connection paths between paired trusted devices may be provided using additional PFED pairs. As the number of paired trusted devices increases the number of paired PFED devices providing point-to-point connections becomes untenable. A solution is provided by virtualizing the PFEDs using software and hosting the PFED devices on a server.

Figure 9:
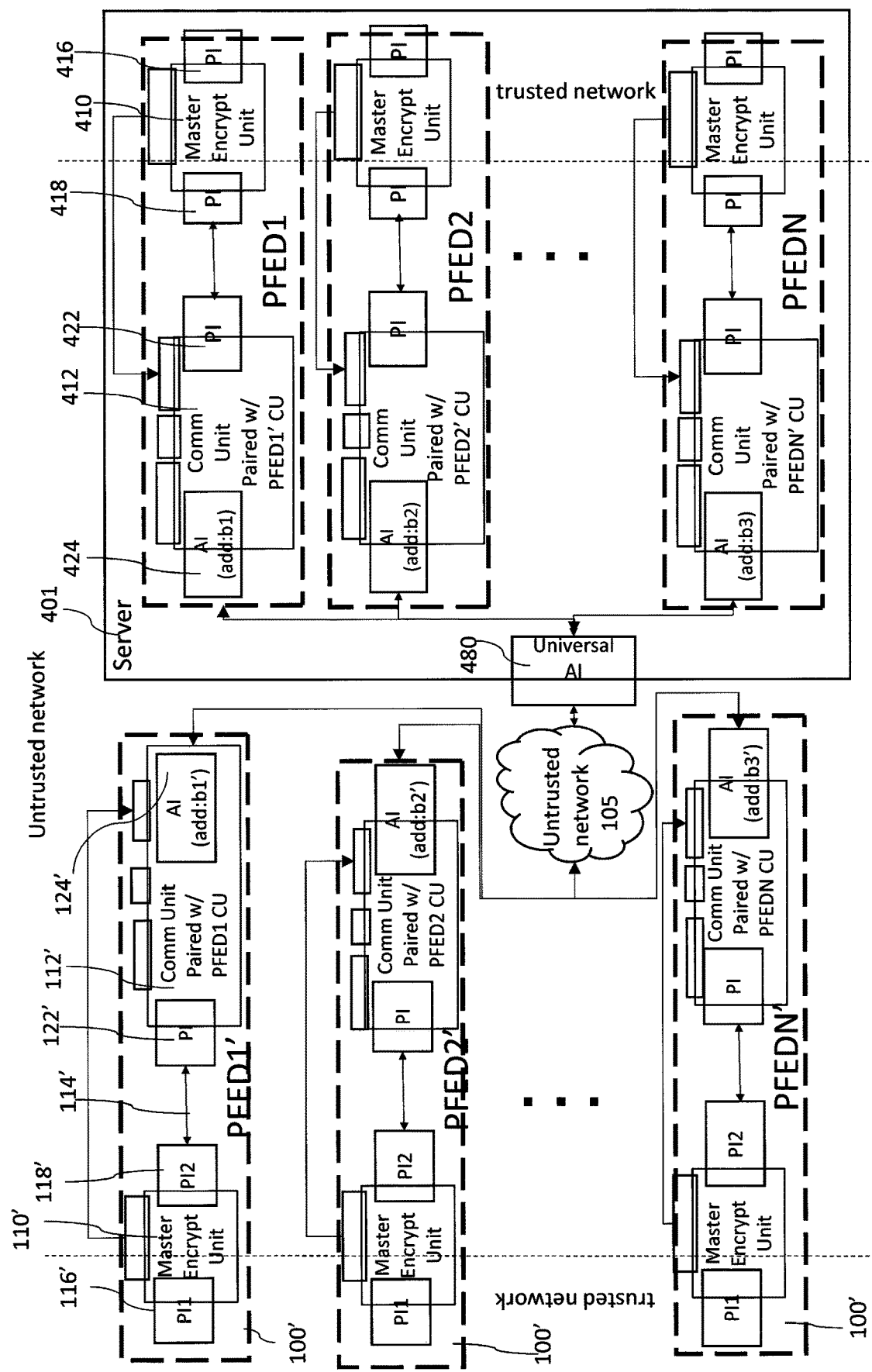
FIG. 9 illustrates a plurality of paired encrypting devices including client-side PFEDs implemented with hardware and virtualized server-side PFEDs.

FIG. 9 illustrates a system 400 including a number of PFEDs (PFED1-PFEDN) virtualized on a server 401 and a number of PFEDs (PFED1'-PFEDN') implemented with hardware. The hardware implementations of PFED1'-PFEDN' are identical to the hardware implementations 100' described above in connection with FIG. 6. Alternatively, in the event an additional layer of encryption is desired, the PFED 200 of FIG. 7 could be used. It is noted that labels associated with interfaces of the PFED devices 100' have been removed in FIG. 9 to improve the readability of the drawing. Any number of virtualized PFEDs may be provided on the server 401. Each virtualized PFED1-PFEDN is the functional equivalent of the hardware implementations 100 illustrated in FIG. 6 or alternatively in the event an additional layer of encryption is desired, each virtualized PFED1-PFEDN is the functional equivalent of the PFED 200. Each virtualized PFED1-PFEDN includes a master encryption unit 410 and a communications unit 412. A connectionless interconnect 414 provides communication between the master encryption unit 410 and the communications unit 412. The master encryption unit 410 includes a passive interface 416 for receiving native data packets 140 from a trusted device (not illustrated in FIG. 9). The communications unit 412 includes an active/addressable interface 424 in communication a universal active interface 480 provided on the server 401. The universal active interface 480 provides a hardware interface between the virtualized active interfaces 424 of the virtualized PFEDs PFED1-PFEDN and the untrusted network 105 and routes messages between the virtualized PFED1-PFEDN and the paired PFED1'-PFEDN'.

As illustrated in FIGS. 6-9, PFEDs may be implemented as point-to-point pairs using small board computer hardware, such as a raspberry pi computer.

Figure 10:
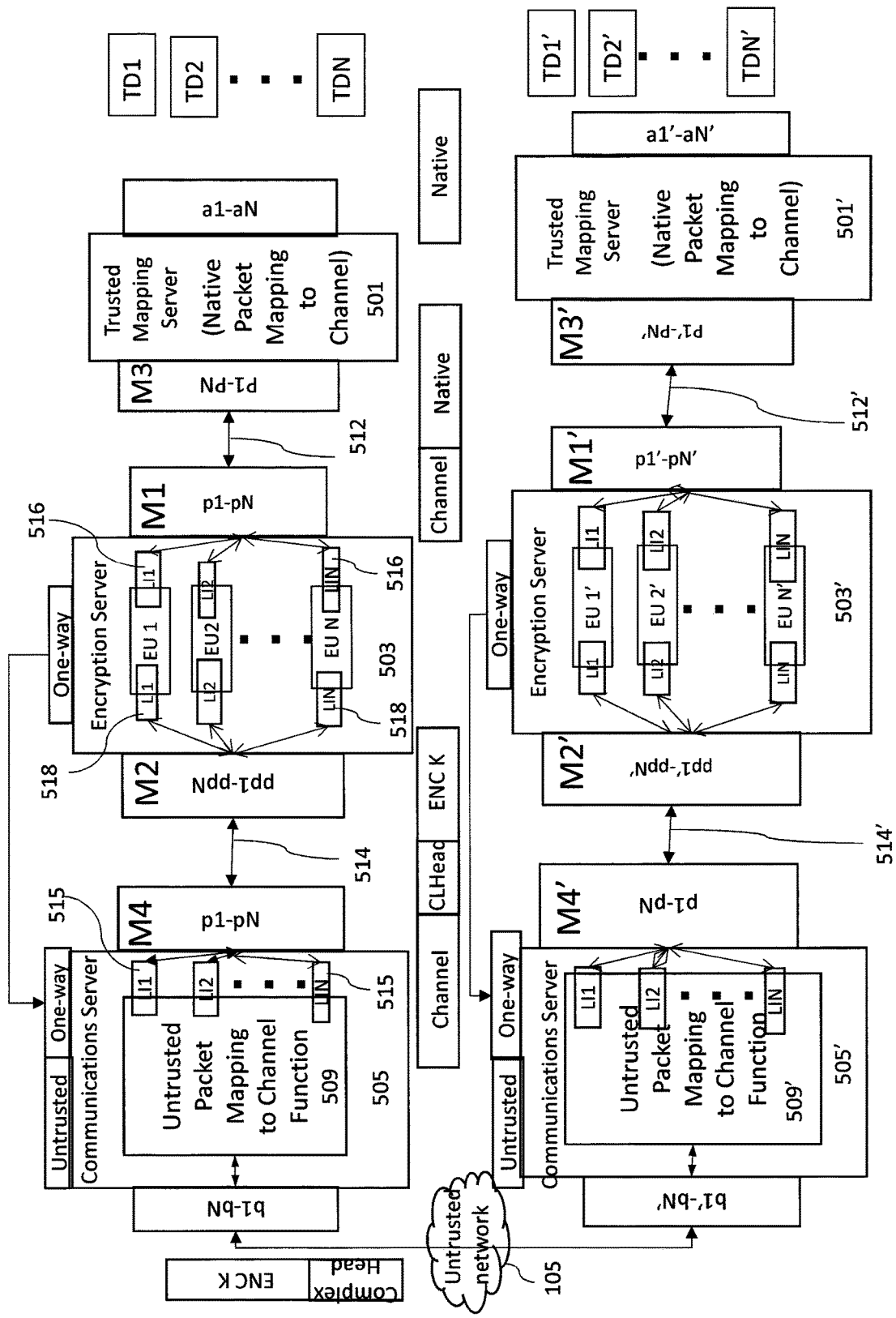
FIG. 10 illustrates a plurality of virtualized encrypting devices implemented on servers and a plurality of paired encrypting devices implemented on servers.

FIG. 10 illustrates multiple point-to-point PFED connections implemented using servers. Servers 501, 503, 505 provide a plurality of virtualized PFEDs and servers 501', 503', 505' provide a plurality of virtualized PFEDS paired with the PFEDs virtualized by servers 501, 503, 505. Servers 501, 503, 505 will be described with the understanding the servers 501', 503', 505' are configured similar to servers 501, 503, 505.

Server 501 is a trusted mapping server and includes shared addressable interfaces a1-aN and shared passive interfaces p1-pN. Shared addressable interfaces a1-aN send/receive plaintext native packets to/from the trusted devices TD1-N over a trusted interconnect (not shown, e.g. an Ethernet cable). Shared passive interfaces p1-pN communicate with server 503. Trusted mapping server 501 converts an outgoing native packet to a channel packet to be delivered to the encryption server 503. Trusted mapping server 501 converts the incoming channel packet from the encryption server 503 to a native packet by adding a channel label to the native packet. Each native packet is associated with a channel which is associated with a trusted device. Optionally, a monitor M3 may be provided at the passive interfaces p1-pN, of the trusted mapping server 501, to monitor native packets received by the passive interfaces p1-pN, to ensure safety from a rogue remote trusted element TD1'-TDN'.

Server 503 is an encryption server and includes shared passive interfaces p1-pN and shared passive interfaces pp1-ppN. Sever 503 further includes virtualized encryption units EU1-EUN. Each virtualized encryption unit EU1-EUN includes a first logical interface 416 and a second logical interface 418. The logical interfaces 416, 418 are passive. Each logical interface 416 is in communication with shared passive interfaces p1-pN and p1'-pN' providing communication with server 501 over a connectionless interconnect 513. Each logical interface 418 is in communication shared passive interfaces pp1-ppN and pp1'-ppN' for communicating with servers 505 over a connectionless interconnect 514. Each encryption unit EU1-EUN is mapped to a unique channel. Each encryption unit EU1-EUN includes a unique encryption key, K1-KN. Alternatively a shared key may be provided for the entire network of channels. Use of a shared key for the entire network of channels would enable a mesh network topology.

Outgoing native packets on a channel are received at the passive interfaces p1-pN of encryption server 503 and routed to the logical interface 416 of the appropriate encryption unit EU1-EUN. The outgoing native packets received by the encryption unit EU1-EUN are encrypted using the associated key. The encrypted packet is then provided with a connectionless header to direct delivery of the encrypted packet to the communications servers 505. Incoming connectionless datagrams on a channel are received at the passive interfaces pp1-ppN of encryption server 503 and routed to the logical interface 418 of the appropriate encryption unit EU1-EUN. The incoming datagrams received by the encryption unit EU1-EUN are decrypted using the associated key. The decrypted packet is then provided to the logical interface 416 to direct delivery of the decrypted packets to trusted mapping servers 501. Although only a single layer of encryption is illustrated in FIG. 10, in the event additional layers of encryption are desired additional encryption servers may be provided Optionally, a monitor M1 may be associated with the passive interfaces p1-pN of the encryption server 503. Monitor M1 monitors outgoing native packets to ensure that the packets are correctly labeled as channel packets by trusted mapping server 501. Optionally, a monitor M2 is associated with the passive interfaces pp1-ppN. Monitor M2 monitors the incoming connectionless datagrams to ensure that the incoming connectionless datagrams include the unique frame type associated with the connectionless header applied by communications server 505 as will be discussed below. If the incoming connectionless datagram does not include the unique frame type, the incoming connectionless datagram is dropped. Incoming connectionless datagrams including the unique frame type are routed to the appropriate encryption unit EU1-EUN, EU1'-EUN' and decrypted as described above.

Server 505 is a communications server and includes shared passive interfaces p1-pN and shared addressable interfaces a1-aN. Sever 505 hosts a communications unit 509 including logical interfaces 515. Passive interfaces p1-pN provide communication with encryption servers 503 over a passive interconnect 514 and shared active interfaces a1-aN provide communication with paired PFEDs provided by server 501' 503', 505' over the untrusted network 105. Each active interface a1-aN of communications server 505 is paired with an active interface a1'-aN' of communications server 505'. Communications servers 505 receives outgoing encrypted connectionless datagrams at the shared passive interfaces p1-pN and forwards the encrypted connectionless datagram to the logical interfaces 515 of communications unit 509. Optionally a monitor M4 may be associated with the passive interfaces p1-pN. Monitor M4 monitors the outgoing encrypted connectionless datagrams to ensure that the outgoing datagrams include the unique frame type associated with the connectionless header applied by encryption server 503. The communications server 505 adds a complex header to each outgoing datagram to provide a packet directed to the appropriate addressable interface a1-aN of server 505'. Communications server 505 receives incoming packets from a paired active interface a1-aN of server 505' and communications unit 509 maps the incoming packet to the appropriate channel based upon the active interface a1-aN on which the packet was received. The communications unit 509 removes the header applied by the paired communications unit 509' and adds a connectionless header to the packet to direct delivery of the packet to the encryption server 503 for decryption.

The connectionless interconnect between trusted mapping server 501 and encryption server 503 and the connectionless interconnect 516 between encryption sever 503 and communications server 505 may be, for example, a common Ethernet interconnect. The passive interfaces associated with these connectionless interconnects are in promiscuous mode and have no assigned address. The untrusted network facing addressable interfaces a1-aN on communications server 505 are not in promiscuous mode and have an assigned address.

The format associated with the connectionless interconnect 512, is a stateless format (i.e. MAC source, MAC destination, type, and payload) and includes a channel label provided by the trusted mapping server 501. The format associated with the connectionless interconnect 514, is also stateless format and in addition to the channel label includes a single unique type, i.e., the PFED-type. Monitors M1, M2, M3 and M4 monitor their respective interface. Any other ether-type label encountered by the monitors M1, M2, M3 and M4 is evidence of something wrong and an appropriate alarm would be activated (e.g. shutdown, log, etc.). This is unlike typical monitoring solutions (e.g. signature or anomaly based, host or network intrusion detection system (IDS)). Typical monitoring solutions are prone to false positives or false negatives and must be more cautious in responding. As a result, the typical monitoring solutions can be spoofed by a clever adversary who can disguise his activity using the ambiguity of a signature. Often an IDS is hosted on a separate machine to protect itself. If the IDS is on a separate machine and detects an event, the IDS can't easily signal the victim. If an event is detected, the IDS logs the event and some other entity must be responsible to respond. Similar to an IDS, each PFED monitor M1, M2, M3 M4 is independent of the sending entities being monitored yet the monitor M1, M2, M3, M4 can react affirmatively, always, without the risk of being spoofed because the monitor is on the same server as the PFED which it is protecting. The monitors M1, M2, M3 and M4 now provide an additional protective layer against exploitation from either the trusted device TD1-TDN or the untrusted network 105. For example, if an adversary were able to gain presence on trusted mapping server 501 and attempted to craft a packet other than a channel labeled packet, M1 would detect the packet and shutdown the communication path, or drop the packet. Similarly, if an adversary were able to gain presence on the communications server 503 from the untrusted network side, any incoming packet other than a connectionless datagram with a PFED-type label would be detected by M2 and encryption server 503 would shutdown, thus blocking any further entry.

This is true defense in depth, not defense in breadth. The adversary has no room to maneuver around the function of the monitors M1, M2, M3, M4. The adversary is forced to use the intended path which is cryptographically protected.

At the communications server 505, (much like a router would do with NAT, Network Address Translation) there are any number of ways to map to a channel using the incoming untrusted network traffic (e.g. IP=channel, IP port #=channel, VLAN id=key/channel, etc). The payload of the untrusted network packet is copied to the payload of the connectionless datagram and sent to the encryption server 503 on the appropriate channel. As the connectionless datagram travels through encryption server 503, the cryptographic processes apply the associated key to decrypt the packet. Any forgery would be detected by an authentication mechanism provided by the cryptography, so even if the wrong channel number was mapped to a key process (maliciously or accidentally), it would fail. Thus, in order for a valid native Ethernet frame to enter the PFED from the active/addressable interface of the communications server 505 and exit the PFED from the active/addressable interface associated with the trusted mapping server many failures would need to occur.

Figure 11:
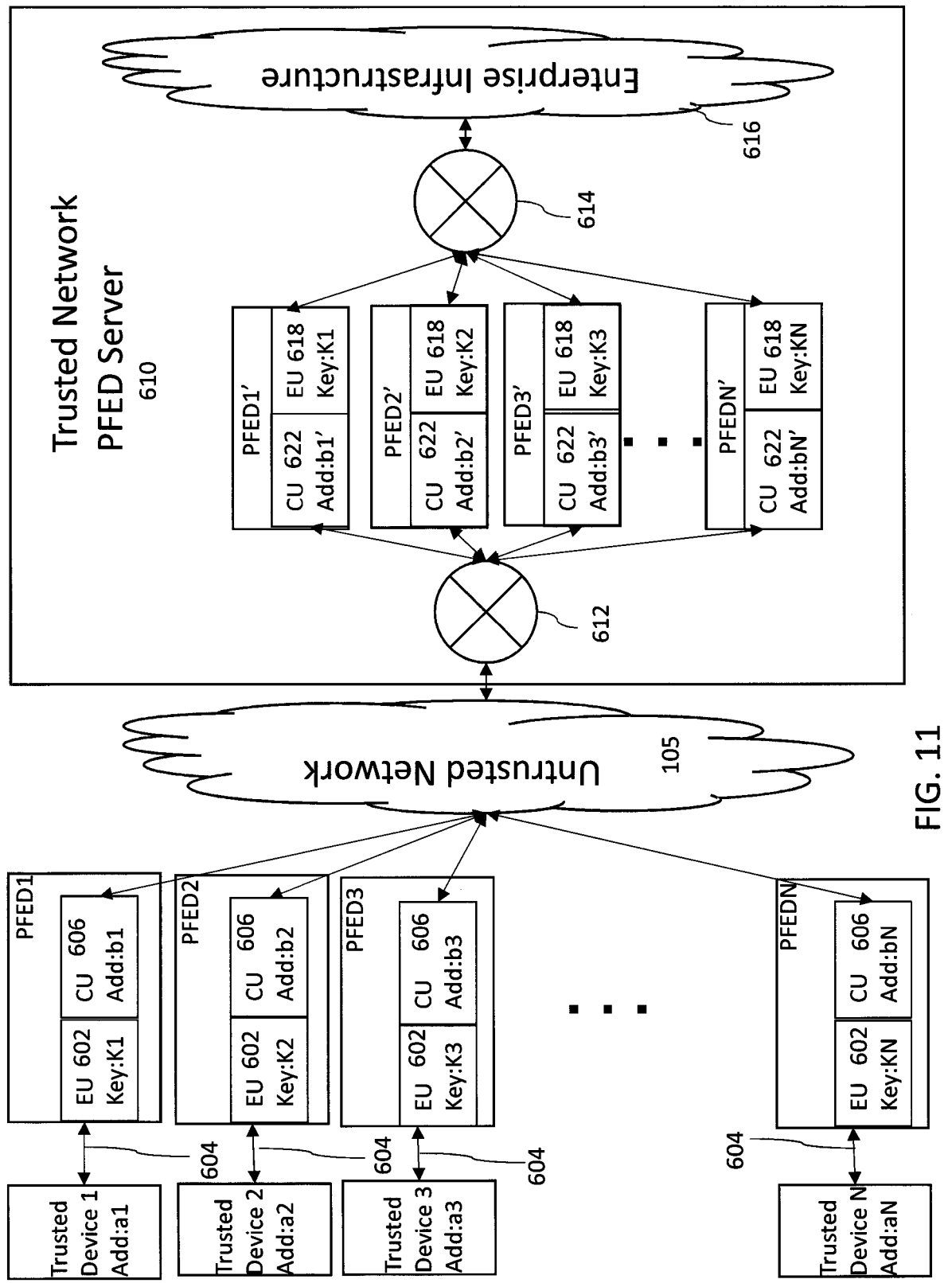
FIG. 11 illustrates a plurality of encryption devices arranged in a hub-and-spoke topology.

Because the traffic on both sides of trusted mapping server 501 is unencrypted, the trusted server 501 can easily route where the incoming packets from the trusted side need to be placed into a channel because it would see the response packets from the untrusted side. Effectively trusted mapping server 501 is a router. For example, the plaintext native packets may be mapped to a VLAN native packet where the VLAN is the channel label that stays with the packet as it goes through the encrypting device to the untrusted network 105. Although a common router can map a layer 3 packet to a common layer 2 packet, the PFED-type is not a common layer 2 packet and therefore a common router may not be able to perform this mapping function but a whitebox switch could be customized to handle PFED-types if the common router is not able to support this capability. FIG. 11 illustrates a system 600 implementing paired PFEDs in a hub-and-spoke topology to allow for communication between trusted devices TD1-TDN. As illustrated in FIG. 11, a number of client-side encrypting devices PFED1-PFEDN are in communication with a server-side encrypting devices PFED1'-PFEDN' via an untrusted network. Each client side encrypting device PFED1-PFEDN receives packets from a client-side trusted device TD1-TDN. Although details of the encrypting devices of FIG. 11 have been removed for simplification of the drawing, it is to be understood that the encrypting devices PFED1-PFEDN of FIG. 11 are similar to the encrypting device 100 or 200 described above and illustrated in connection with FIGS. 6 and 7. Each encrypting devices PFED1-PFEDN includes an encryption unit 602 having a passive interface in communication with a trusted device TD1-TDN via a trusted interconnect 604 and a communications unit 606 having an active/addressable interface for communication with an untrusted network 105.

The server-side encrypting devices PFED1'-PFEDN' are hosted on a PFED server 610 of a trusted network. The PFED server 610 also hosts an untrusted router 612 in communication with the untrusted network 105 (e.g. the Internet) and a trusted router 614 in communication with the enterprise infrastructure 616 of the trusted network. Each server-side encrypting device PFED1'-PFEDN' includes an encryption unit 618 having a passive interface in communication with a trusted router 614 via a trusted interconnect 620 and a communications unit 622 having an active/addressable interface for communication with an untrusted network 105 via the untrusted router 612.

Each client-side PFED PFED1-PFEDN is paired with a server-side PFED PFED1'-PFEDN' to provide PFED pairs. For example client-side PFED1 (including a communications unit addressable interface associated with address b1) is paired with server-side PFED1'(including a communications unit addressable interface associated with address b1'); client-side PFED2 (including a communications unit addressable interface associated with address b2) is paired with server-side PFED2' (including a communications unit addressable interface associated with address b2'); and client-side PFED3 (including a communications unit addressable interface associated with address b3) is paired with server-side PFED3'(including a communications unit addressable interface associated with address b3'), etc.

Transmission of messages between trusted devices TD1-TDN will be described using an example of a message being transmitted from trusted device TD1 to trusted device TD2 in FIG. 11. To begin, trusted device TD1 generates a native packet identifying the source address a1 and the destination address a2 in its header. This packet is encrypted by encryption unit 602 of PFED1 and sent across the untrusted network to the untrusted router 612 where it is forwarded into a preassigned channel associated with PFED1'. The native packet emerges onto the interconnect to the trusted router 614. At this point the trusted router can decide where to send the packet, it might be intended for a device in the Enterprise Infrastructure or another TD located remotely. In this case the router will know to hairpin the packet back to the PFED2' channel because it has identified that channel to be associated with the destination of trusted device TD2 located in the just received native packet. The packet is sent through the server to the untrusted network on the channel assigned to PFED2', encrypted and arrives at the Communications unit of PFED2 to then be decrypted through the path described earlier in FIG. 6 or FIG. 10. It emerges as a native packet on the interconnect 604 and is received by trusted device TD2.

FIG. 11 illustrates how multiple trusted devices TD1-TDN can route to each other without any knowledge of the untrusted network 105, in effect "blind routing". This is further enforced by the uniquely matching keyed nature of the paired PFEDs for each trusted device. For example, the communications unit 622 of server-side encrypting device PFED1' is pre-configured to communicate with address b1 and similarly the communications unit 606 of client-side encrypting device PFED1 is pre-configured to communicate with add:b1'. If the untrusted router 612 maliciously or accidentally forwards frames from trusted device TD1 to a server-side encrypting device other than PFED1', the frame will be decrypted with the wrong key. As a result, the cryptographic authentication check will fail and that frame will be dropped before it enters the trusted router 614.

An advantage provided by the encrypting devices PFED1-PFEDN, PFED1-PFEDN is that no specialized trusted or untrusted networking hardware is required to integrate this encryption into an existing enterprise network. The network hardware is 100% off the shelf. Standard Cisco/Juniper/server/etc gear. In addition only standard network configuration and administration skills are required to configure and administer the system 600. Thus, integration of the encrypting device PFED1-PFEDN into any enterprise network is very low touch. The trusted network 610 operates in the same manner as if the untrusted network 105 never existed. It is noted that MACSEC performs OSI layer 2 point-to-point encryption between to physical interfaces on an existing interconnect. A PFED pair creates a layer 2 end-to-end MACSEC-like link but does not require that the immediate neighbor device be an endpoint. It solves the same problem Cisco's pseudo wire technology does but does so in a different way.

Another advantage provided by the encrypting devices PFED1-PFEDN, PFED1-PFEDN is that nearly any type of trusted device may be wired to the first passive interface of the encryption unit of encrypting device (i.e., the "promiscuous end" of the encrypting device) and just about any network can be connected to addressable interface side of the communications unit of the encrypting device (i.e. the "addressable end" of the encrypting device). For example, one might connect a pair of USB headphones to the promiscuous end of the encrypting device. Alternatively, one might connect the addressable end of the encrypting device to a satellite phone instead of an Ethernet. The cryptography provided by the encrypting device does not constrain the connections to the encrypting device because the encrypting device has no dependency with either the trusted or untrusted network traffic. The encrypting device is a proverbial "bump on the wire". Thus, another advantage provided by the encrypting device is that the trusted devices on either side of the encrypting device bump can be replaced/refreshed at different time frames.

Figure 12:
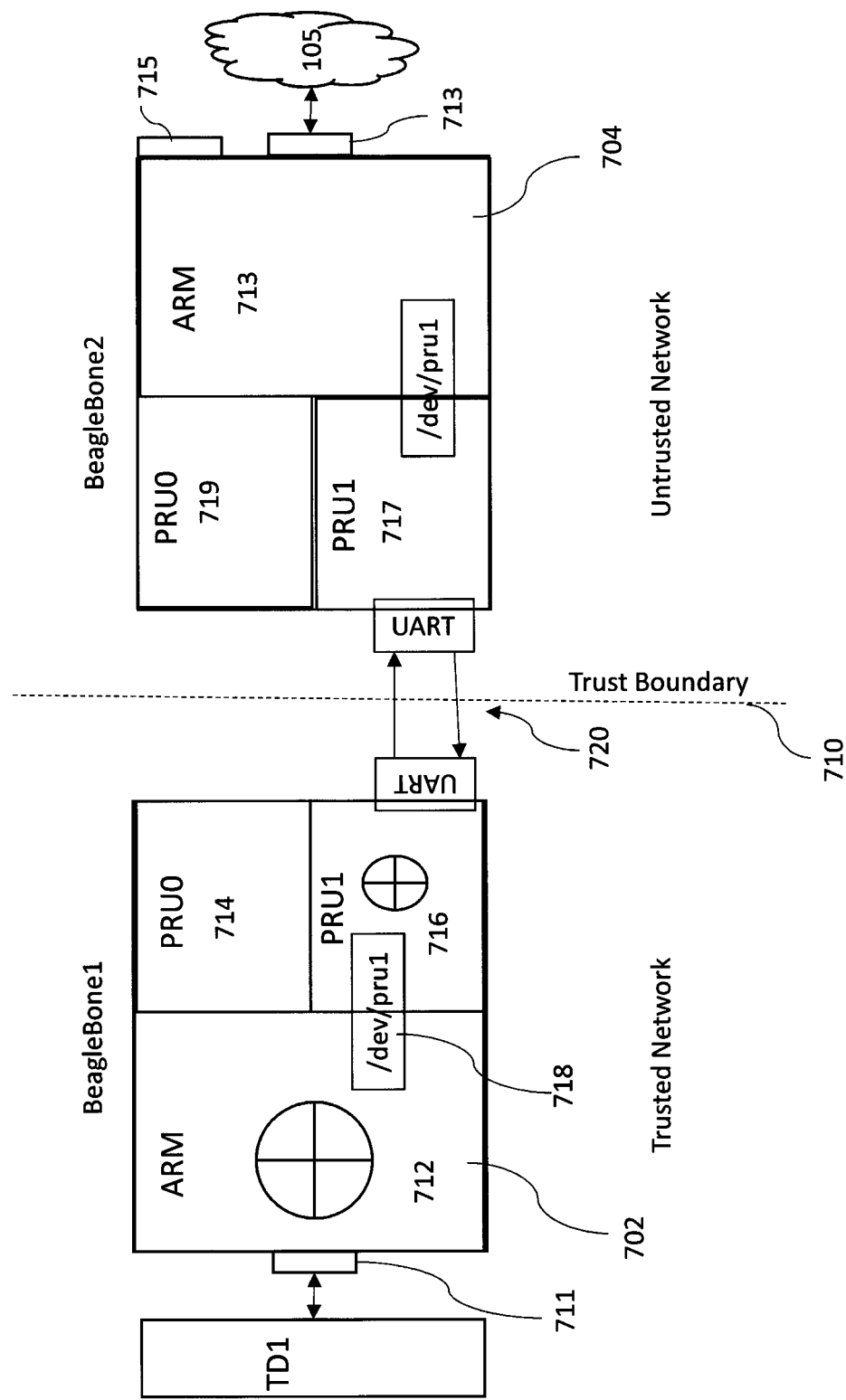
FIG. 12 illustrates an implementation of the encrypting device of FIG. 7, using COTS devices.

FIG. 12 illustrates an implementation 700 of a PFED illustrated in FIG. 7 using COTS hardware. The COTS hardware includes two BeagleBone small board computers (SBC) 702, 704. A first Beaglebone SBC 702 is provided on the trusted network side of the trust boundary 710 and sends/receives data to/from a trusted device via an passive interface 711. A second Beaglebone SBC 704 is provided on the untrusted network side of the trust boundary 702 and sends/receives data to/from an untrusted network 105 via an active/addressable interface 713. Each BeagleBone SBC includes a Texas Instrument System on Chip ("SOC", more specifically an AM355x) Each Texas Instrument SOC contains several independent CPUs; an ARM microprocessor 712 (the primary CPU) and two slave microcontrollers 714, 716 (PRU0 and PRU1).

The ARM microprocessor 712 of the trusted Beaglebone 702 provides the master encryption unit 110 illustrated in FIG. 7 and runs conventional Linux. The encryption functions are implemented in a software process/library and currently implement 256 bit AES in GCM mode. The management functions of the encryption unit are also provided by the ARM 712. The slave microcontroller PRU1 716 corresponds to the additional encryption unit 202 of FIG. 7. PRU1 716 runs a small bit of custom C code supplied by the ARM 712. PRU1 716 has its own memory and direct access to some peripherals. The encryption provided by PRU1 716 is a version of 256 bit SPECK in ECB mode. It is equivalent in strength to AES but is designed to run well in underpowered environments. The PRU0 714 is unused. An interconnect /dev/pru1 718 corresponds to connectionless interconnect 204 illustrated in FIG. 7 between the master encryption unit 110 and the additional encryption unit 202. The interconnect /dev/pru1 718 is a shared memory interface. The Universal Asynchronous Receive Transmit (UART) link 720 is a two-wire link (having a 64 byte FIFO buffer) and corresponds to the connectionless interconnect 206 between the additional encryption unit 202 and the communications unit 112 of FIG. 7.

The untrusted BeagleBone2 704 corresponds to the communications unit 112 in FIG. 7. PRU1 717 of BeagleBone2 704 receives the serial data from the UART link 720 and sends the data to the ARM 713 which re-packages the data to be sent across the untrusted network 105. The ARM 713 of BeagleBone2 704 is also running Linux. The ARM 713 on untrusted Beaglebone2 704 can also implement a VPN to tunnel across the untrusted network 105, however, this VPN tunnel is not required for the assurance of the cryptography done by BeagleBone1 702 because all data leaving the additional encryption unit provided by PRU1 716 on BeagleBone1 702 via UART 720 is completely encrypted.

A web interface 715 is provided by the untrusted interface (See untrusted interface 128, FIG. 6) on the ARM 713 of BeagleBone2 704 and enables configuration of the communications provided by BeagleBone2 to the network 105 and a paired encryption device using an untrusted device (See untrusted device 132, FIG. 6). An innovative routing path in the communications unit using NAT will allow for interaction between the untrusted device through the communications unit 704 to any device on the untrusted network. For example, captive portals typically found in hotels to allow Internet access for guests. As a result, the hotel network thinks it is talking to the communications unit 704, rather than the untrusted device. The effect is the MAC of the communication unit 704 will be what the hotel registers, not the MAC of the untrusted device. This eliminates the need to have an unencrypted bypass between the untrusted hotel network and the trusted device TD1 in order to present the MAC of the communications unit 704 to the captive portal. Because no bypass is created, there is no additional hole in the trust boundary that must be carefully analyzed. In addition, the trusted device TD1 is required to connect directly to the untrusted hotel network where it could be exploited while it is not protected by the encryption. For example, a malicious captive portal might try to hijack the browser in TD1 before it allows connectivity to the internet 105. This allows a user to easily adapt to his local network conditions using a non-PFED device (i.e. personal phone/laptop/etc) in order to gain connectivity back to the server/hub if he happens to be accessing a restricted public network.

Once the PFED hardware is implemented, a vendor's support tail is just two C programs: a larger one that runs on the ARM 712 and a very small one that runs on PRU1 716. Everything else is stock, off the shelf software and off the shelf hardware. Everything about the trusted device TD1 and network is stock as well. If one gets tired of the trusted device TD1, it may be replaced without disruption to any other component. Likewise, if the network 105 is upgraded, the communications unit 713 of the BeagleBone2 704 can be changed. Alternatively, the encryption units 712, 716 of the BeagleBone1 702 may be changed while the communications unit of the BeagleBone2 704 or trusted device TD1 remains unchanged. Each of the components i.e., the trusted device TD1, the encryption units (provided by BeagleBone1) and the communications unit (provided by BeagleBone2) are independent. This permits updating each component on a different schedule if so needed. Tech refresh could happen frequently without losing a large sunk cost of more traditional high assurance designed gear that has many complex interdependencies with the ecosystem.

Figure 13C:
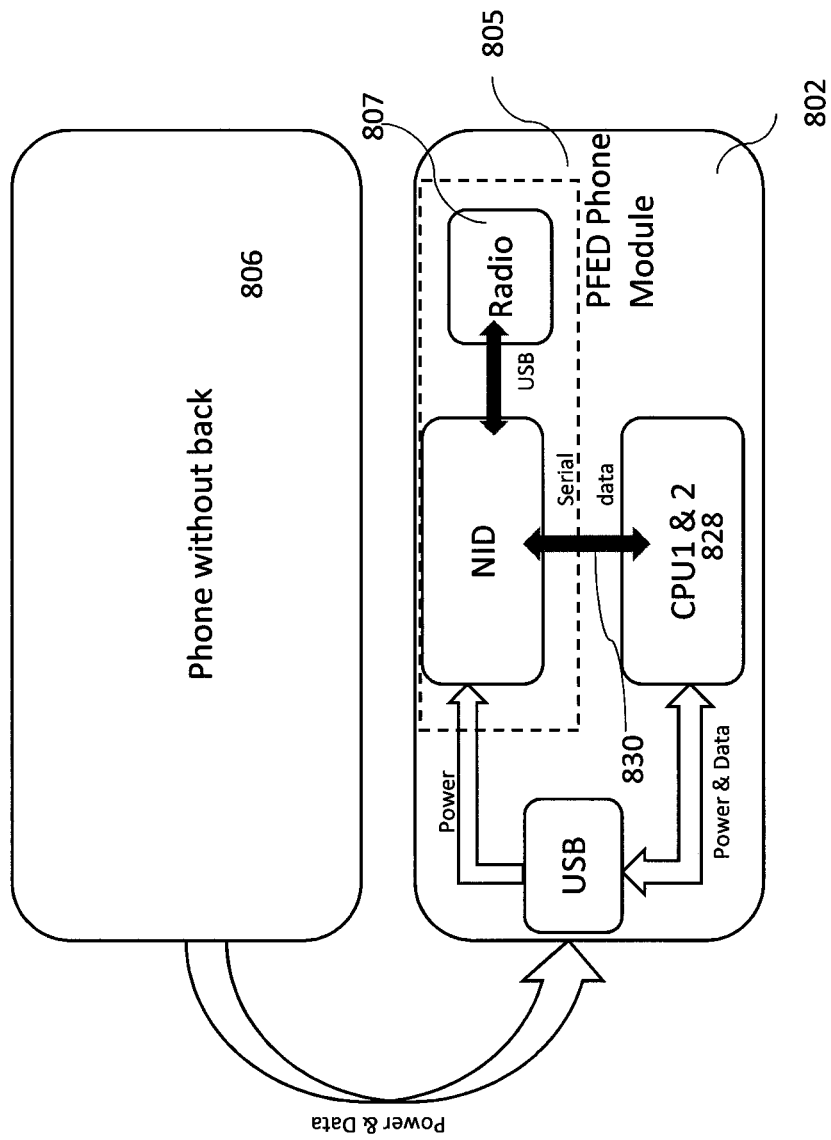
FIG. 13c illustrates a portion of the implementation of FIG. 13a in further detail.

To solve the radio vulnerability of a mobile phone discussed above, the PFED (e.g. PFED 200 of FIG. 7), can be packaged into a small form factor to create a PFED phone module approximately the size of two stacked credits cards which can comfortably fit on the back of a stock mobile phone (e.g. a Nexus 5 mobile phone). The PFED phone module 800 is illustrated in FIGS. 13a-c. The PFED phone module 800 includes a PFED backpack 802 providing a protective housing 804. As illustrated in FIG. 13a, The PFED phone module 800' is mounted to the stock phone 806 by removing the back plastic cover of the stock phone 806 and replacing the back cover with the PFED phone module 800. The PFED backpack 802 is similar to the PFED 700 illustrated in FIG. 12 except that the PFED backpack 802 consists of two pocket-sized Beaglebone SBC's (which are smaller versions of the BeagleBone SBC's 702, 704 illustrated in FIG. 12) and as illustrated in FIG. 13c, the communications unit 805 of the PFED backpack 802 includes a radio chipset 807 which serves as the communications unit of the PFED phone module 800, and a USB interface 808. The radios in the stock phone 806 were neutered and the radio chipset 807 of the PFED phone module 800 replaces the radio of the stock phone 806.

As illustrated in FIG. 13b, the data pins 810, 812 on the stock phone 804 are internally connected directly to the data pins 814, 816 of the PFED phone module 800. The housing 804 includes a charging port 818. The external data pins 820, 822 on the charging port 818 are disconnected in order to prevent a malicious USB device from plugging directly into the trusted device (i.e. the phone 806). The housing 804 of the PFED phone module 800 may be 3D printed and replaces the original plastic back cover. The PFED phone module housing 804 mounts to the back phone chassis using the same connections as the original back cover. As illustrated in FIG. 13c the PFED backpack 802 includes small board computer 828 providing the PFED master encryption unit and an additional encryption unit, a small board computer 830 together with the radio chip set 807 provides the PFED communication unit, and a serial interface 830 provides communication between the small board computer 828 and the small board computer 830. The radio chip set 807 is in communication with the small board computer 830 via a USB connection. The USB interconnect 818 allows power to the small board computer 830 (i.e. the communications unit) and allows power and data to the small board computer 828 (i.e. the encryption units). As in FIG. 13*b*, only the externally exposed power pins of 818 are connected to the internal devices 828, 830. The data rate seen by a trusted device 80 using the Beaglebone PFED backpack module 800 is 6-10 Mbytes/sec over the Internet. This is exceptional when considering this module is using a serial UART 820 over a single pair of wires. This bandwidth is more than adequate for voice, video and data rates required by the applications on the phone. This is even adequate for several trusted devices connecting over one PFED link. Namely the PFED module 800 acts as a bulk encryptor. Nothing was altered on the stock phone 806 except the radio. The applications associated with the stock phone 806 work seamlessly, i.e. as if the applications were directly connected to the enterprise infrastructure, due to the protocol-free nature of the promiscuous PFED interface.

The small SWAP requirements of the Beaglebone components allow the high assurance PFED module to be easily attached to standard IT equipment of almost any size. For a modest bit of expense, one can easily make a custom PFED board to contain all of the components in FIG. 13*c*. Similar to the PFED phone module, a PFED laptop module provides integration of the PFED module with a conventional laptop or tablet. Any kind of case/housing integration is possible with a 3D printer using many kinds of materials.

A battery was not added to the housing 804. The power management provided by the stock phone 806 was not altered. The PFED phone module 800 is powered by the stock phone 806 battery and in a test environment, the phone battery lasted for approximately 5 hours before needing a recharge. The module 800 could be modified to include a modest supplemental battery which would be sufficient for continuous daily use. Alternatively, a small USB charging battery may be used to bridge the gap from 5 hours to 10 or more continuous hours. A PFED laptop/tablet module was also tested. The PFED laptop/table module lasted significantly longer with a laptop or tablet as the trusted device due to the much larger battery associated with the laptop/tablet.

Figure 14:
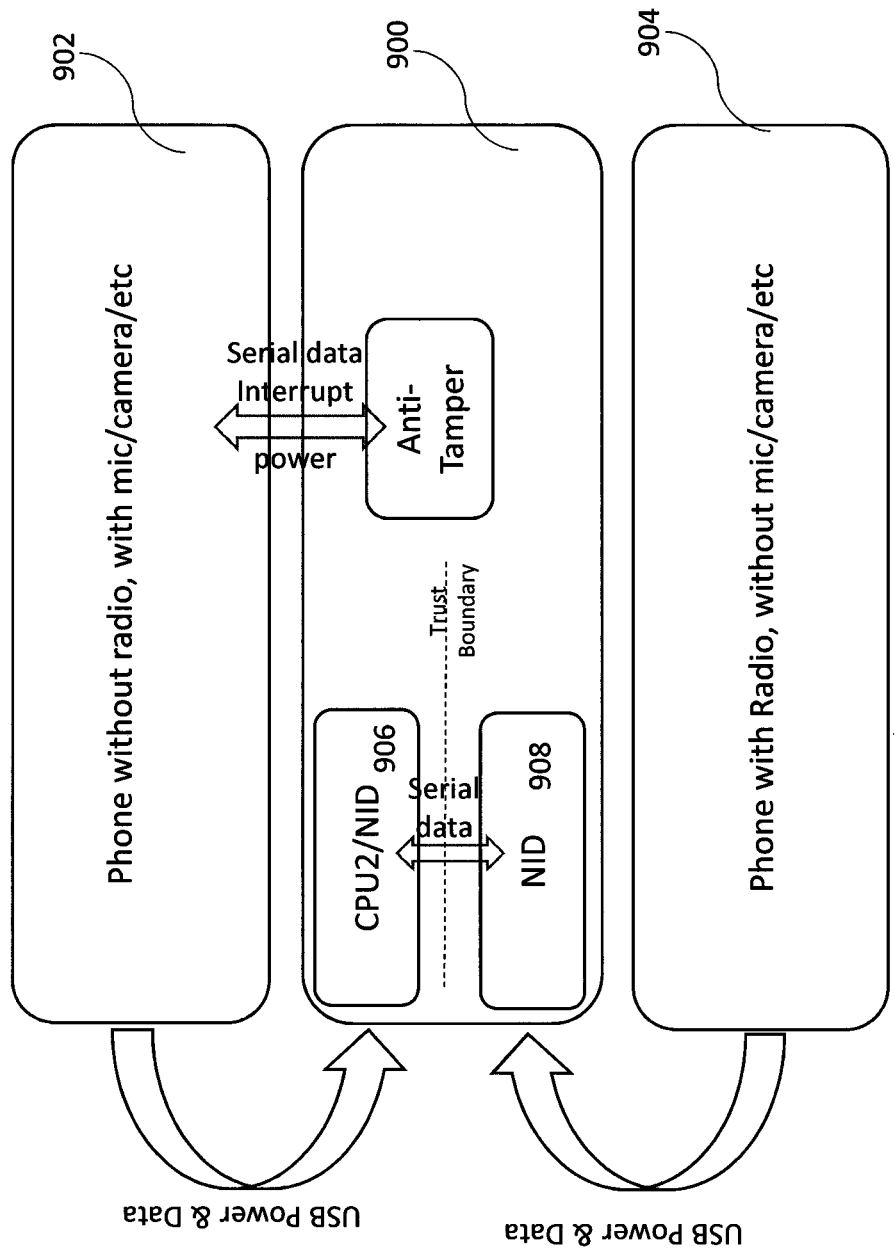
FIG. 14 illustrates an implementation of the encrypting device of FIG. 7 as an inner-PFED module.

An inner PFED module 900 is illustrated in FIG. 14. As illustrated, two phones 902, 904 are combined with the inner PFED module 900. Phone 902 is designated as a trusted phone and is provided on the trusted side of the trust boundary. Phone 904 is designated as an untrusted phone and is provided on the untrusted side of the trust boundary. The trusted phone 902 includes all of the peripherals normally provided in a stock phone (e.g. screen, camera, microphone, etc.) but all RF elements have been disabled (e.g. removed, neutered, etc.). The untrusted phone 904 has a screen and a radio but any other peripheral interfaces that might create a single step breach to the trusted enclave are disabled (e.g. microphone, camera, etc). The inner-PFED module 900 is positioned between the phone 902, 904 and adds a second layer of encryption and acts as the trust boundary between trusted phone 902 and untrusted phone 904. The inner-PFED module 900 includes a trusted CPU2/NID 906 providing encryption and a NID 908 providing a communications unit. The CPU2/NID 906 and the NID 908 may be implemented using pocket-sized Beaglebone SBCs.

The inner PFED module 900 can also house anti-tamper circuitry that is linked to the trusted phone 902. This has a unique property that it is independent from the trusted phone 902. Thus it can act redundantly or uniquely to the CPU1/trusted phone 902. For example, a mobile user must go to sleep and the device must remain but there's no safe place to store device while "unattended". There could be an accelerometer on the anti-tamper module to enable a robust protected at rest mode where it has a notion of its location and the phone 902 has a different sensor to compute its location. The locations could be periodically compared and if a delta threshold is passed, the anti-tamper module issues an appropriate alarm. The user might then must enter a PIN within a time-out period or the device is zeroized. Any number of schemes could be integrated between the anti-tamper module and an anti-tamper application/function running on the trusted phone. In addition to the traditional anti-tamper case protective role.

The implementation illustrated in FIG. 14 has a useful property in that the device could provide two modes of operation, a conventional mode used to make conventional calls and high assurance mode used to make high assurance calls as long as the dangerous peripherals on the untrusted phone 904 (e.g. mic, camera, etc.) can be dynamically and affirmatively enabled or disabled depending on the mode of operation. Other mechanical features are included to make it easy for the user to transition between the high assurance and conventional modes of operation and to enable visual inspection to determine which mode the inner PFED module 900 is currently operating under.

Figure 15:
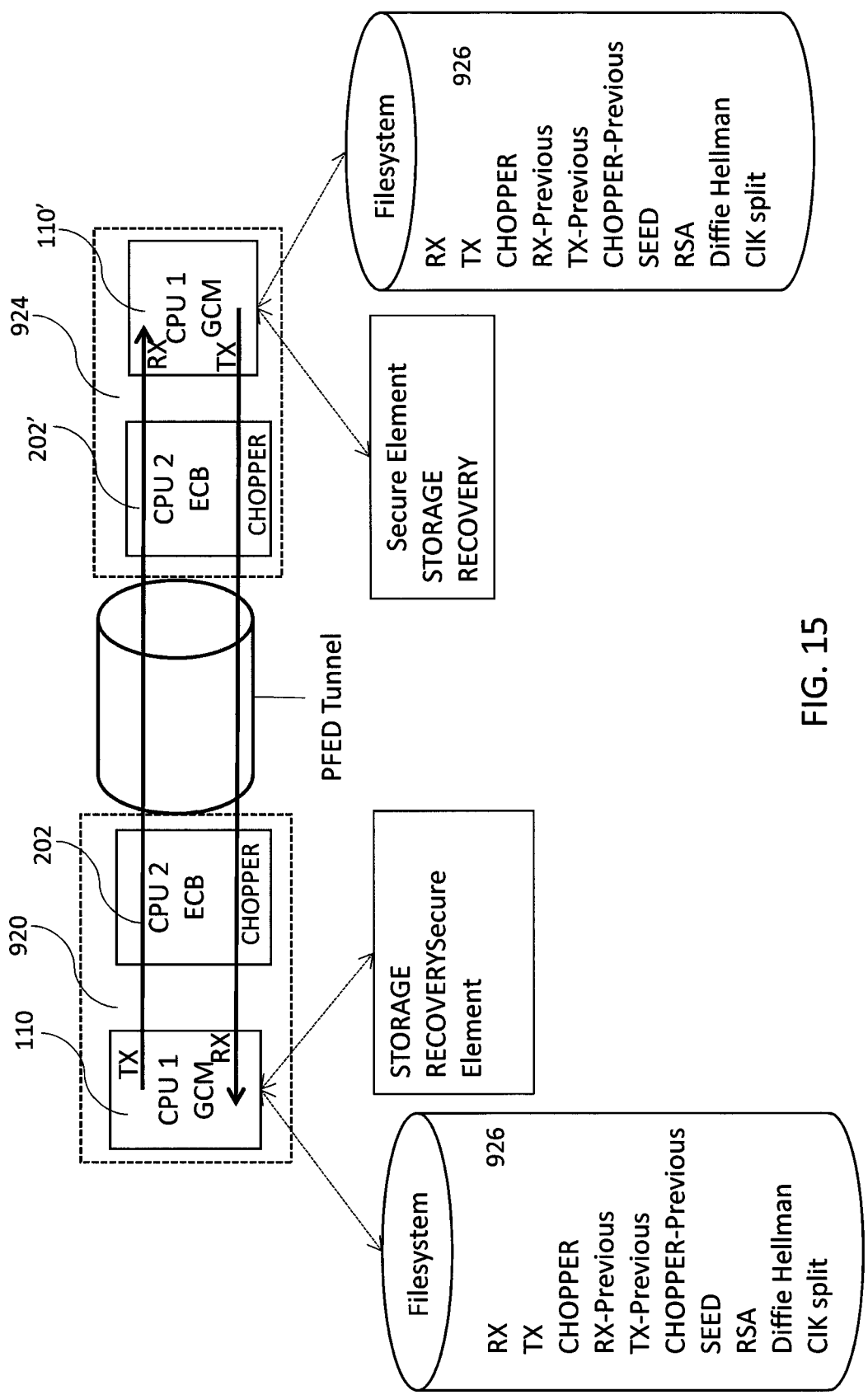
FIG. 15 illustrates key types and storage of the keys of the encrypting device of the present invention.

FIG. 15 illustrates how keys are used by the encrypting device of the present invention (e.g. device 200 illustrated in FIG. 7) and where the keys are stored. FIG. 15 illustrates an encryption unit 920 (including a master encryption unit 110 utilizing GCM and an additional encryption unit 202 utilizing ECB) of PFED1 and a paired encryption unit 924 (including a master encryption unit 110' and an additional encryption unit 202') of PFED1' The master encryption units utilize GCM, for example, and utilize the RX and TX session keys. The additional encryption units utilize ECB, for example, and utilize the CHOPPER session keys. The keys associated with each PFED are stored on flash filesystem. A secure element is provided to store a STORAGE key and a RECOVERY key. A STORAGE key encrypts/decrypts the keys kept on the flash filesystem 926. This is done with AES 256 bit GCM to provide both confidentiality and integrity.

Each direction of a channel (i.e. RX, TX) has a different key. CIK is the device portion of a split Crypto Ignition Key. The other portion lives elsewhere in a token that is attached to the untrusted interface 132 in FIG. 7. Every time a rekey transaction occurs, the existing session keys (TX, RX, and CHOPPER) are stored in their Previous slot. The RECOVERY key is used in a key recovery transaction when the session keys and their previous versions have become desynchronized. The Diffie Hellman contains the Prime and the Generator and is not a key per se, however, the generator is being kept private in the Diffie Hellman key exchange.

The combination of GCM and ECB modes was intentional and illustrates how one could safely use a simple low power additional encryption unit as illustrated in FIG. 7. Normally ECB is a bad mode because the same plaintext will produce the same ciphertext, thereby any repeating plaintext structure will be revealed in the ciphertext. However, it is a very simple mode to implement and easy to inspect for correctness. Because the encrypted GCM output from master encryption unit is random, there is no repeating structure. Thus, the mode in the additional encrypting unit can be much less compute intensive for the same effect.

The entropy pool is derived from several sources on a PFED. For example, a HW RNG on a TI chip, which is a twenty-four ring oscillator; a /dev/urandom in Linux that mixes in system entropy; and finally a random SEED key that is installed during pre-provisioning. These sources are combined into the entropy pool.

Provisioning a PFED pair is autonomous, requiring just physical presence to power cycle the PFEDs pair twice. Once for pre-provision and once for provisioning. Provisioning happens in stages. The untrusted side must be configured to connect before the trusted sides can communicate with each other. This can be a dedicated local connection or over a public network. Much like a rekey transactions are OTNK (Over The Network Keying), effectively this can optionally be OTNP (Over The Network Provisioning).

Provisioning requires a matching recovery key to be pre-placed in both PFED's. This can be done in a factory during production or by the user in the field. The recovery key should be unique to the pair. It should be random. It serves to constrain any provisioning to only a paired PFED that shares this key. Ideally it's placed into immutable memory (e.g. OTP fuses). Virgin PFED's are now ready to provision.

Both sides are powered on. Pre-provisioning begins. There are many schemes to accomplish over the air initialization that those familiar would understand.

This provisioning process with pre-provisioning and provisioning stages permits the flexibility that a vendor does not have to be completely trusted if so desired by the user. The user can safely provision the device again at their leisure after the device has left the factory. And again and again. The keys will remain a secret, even to the user, even if the vendor knows the fused recovery key.

Provisioning the untrusted side of the PFED ultimately means the untrusted address of the client (UAC) must be recognizable by the untrusted network and the untrusted address of the server address (UAS) must be installed into the client such that there's a path on the untrusted network between the Client and Server PFED. UAC and UAS are specific to the untrusted network—typically an IP address or an IP address:port. Provisioning them could be done several ways. The simplest is where UAS and UAC are static. They are manually installed into each PFED pair. Or it might be a dynamic client address, which means the communications unit must have a DHCP client. The server side does not need to know the address of the client ahead of time since the client always initiates the connection but if the untrusted network is static, it can be helpful to be installed too. An alternative is to have every client PFED pre-programmed to connect to a known directory server, or a set of them to have redundancy. The client would query the DNS server with its ID and the server returns ultimate PFED server address. This simplifies the provisioning of the client since it would be done centrally by updating the DNS server response for the specific PFED as it's deployed, instead of doing something specific to each client. The DNS server could be integrated with the server communications unit to allow centralized management of many untrusted addresses of the client PFEDs. Another consideration is to encrypt or somehow authenticate the transactions between communications unit and DNS server to prevent malicious DNS replies. A further communications unit refinement might be to install a VPN on the communications units of the client and server PFEDs. This is not necessary to enhance the assurance of the trusted side of the PFED. Rather it can facilitate privacy against any observer on the untrusted network. It can also help with "punching a hole" through gateways that might be between the PFED client and PFED server.

The trusted device is surprisingly resilient to dropped traffic. Many applications are UDP based and manage their own traffic flow. However, if there's a trusted device requirement for ordered frame delivery, this can be accomplished by configuring the client communications unit to connect with TCP instead of UDP. There is no out of order delivery of a frame after it has arrived at the communications unit since the Interconnects work serially as FIFO queues. The communications unit puts the encrypted packets from encrypted unit into a UDP frame by default and this has not adversely affected user experience.

Figure 16:
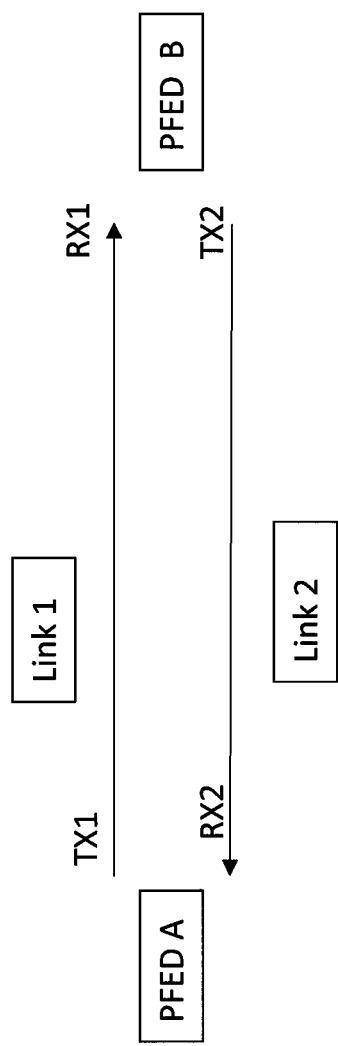
FIG. 16 illustrates a key recovery process utilized by the encrypting device of the present invention.

FIG. 16 illustrates an example of a recovery transaction used in the event of link failure. Cryptographic failure can only be detected by the RX side of the link, typically using the authentication mechanism. The failure is detected after several frames fail to decrypt in a row. Periodic but not sequential bad decrypts is a symptom of line noise. When link failure is detected by the receiver, a recovery transaction is started. As illustrated in FIG. 16, B first detects a failure on link 1. B installs his Previous RX key into RX1 and begins beaconing a recovery message with the current TX key in TX2 on link 2. If A successfully receives it, he move his previous TX key to TX1 and beacons with an ACK beacon to B on link 1. If B receives the ACK beacon (i.e. the keys are matched for that direction), the recovery transaction was successful and B stops beaconing. If A fails to receive it, B continues to beacon and A will eventually reach a threshold at RX2 to then begin a rekey transaction on his side too.

A and B have the same beacon thresholds without a successful decrypt of an ACK before a transition to a new key. For example, upon first three failed decrypts in a row, begin beaconing. After first 5 beacons in a row and no ACK, move the previous TX to TX. Continue beaconing. If after another 5 beacons, move the previous RX to RX. If after another 5 beacons, then move the dynamic recovery key to TX and RX. If after another 5 beacons, then move to the static recovery key. If after another 20 beacons, then stop. At any point up to this moment, if an ACK was received, that means the links are back in sequence and to stop beaconing. Otherwise, something has happened to the recovery keys or they weren't matched in the first place. It is optional what to do at this point. For example, stop the machine and force a manual step to initiate a re-provision. Bring the device in to be checked by technician. Etc. If a rekey is successful, one might then initiate a rekey session to move off the old key before bringing the EUD traffic back online. If the recovery converges on the recovery key, it must begin a rekey before sending EUD traffic. The recovery key is not a guaranteed secret.

None of the recovery is happening in the clear. Even if both directions of a session are corrupted, and the Previous keys are also corrupted (i.e. there's no way to communicate a transaction), this will always recover if the recovery keys match. Recovering inside of a tunnel is important because if the keys are out of synchronization, this is a vulnerable time for the implementation to be maliciously messed with. It also negates the need to engineer a secure bypass that would operate in the clear temporarily to re-establish state.

Key recovery from a completely incommunicado state is possible due to having separate keys for each link direction. If the just RX link is broken, it's possible to send a valid message on the working current TX link. If both link directions are broken but the Previous key slots match, then eventually the TX and RX session keys will converge on them, one link at a time. If Previous keys are somehow also mis-matched, the same convergence will happen with the Recovery key. This works because each side has the same fixed number of times a recovery beacon is sent after each key upgrade. If a side doesn't receive a decrypted frame within those beacons, it escalates to the next appropriate session key and begins beaconing another fixed number of times. Eventually each key exhausts to the recovery key or never (if the recovery keys don't match). The recovery key should be kept in a permanent media (e.g. OTP fuses) to make it unlikely that a memory bit flip might cause a complete denial of service.

The PFED of the present invention provides several advantages. The PFED creates a very small trust boundary and as a result can be paired with many different form factors to create a high assurance certification for the package. The PFED has a minimal lifetime operational cost due a simplified key management scheme and its SWAP form factor can be easily integrated to secure data in transit of any type of trusted device (e.g. phones, tablets, laptops, desktops, etc.). The cost of the implementation of the PFED compared to the conventional high assurance implementations is orders of magnitude less for several reasons. No specialized hardware is need to implement the PFED. The PFED device does not utilize a complex key management processes, once provisioned, the PFED pair manages itself. The PFED can autonomously recover the key without a bypass even when the key has been completely corrupted and neither PFED can communicate. In addition to removing any risk of contamination of the trusted device/enclave, lack of a bypass from the trusted environment to the untrusted environment makes the evaluation device much easier and thus faster, cheaper, more accurate, etc. The amount of custom software implemented by the PFED is very small and the necessary functionality of software with the hardware is simple. This makes it feasible for an evaluator to generate a deep opinion on the safety of any implementation, quickly. There's not much to examine with each trust boundary. Less time spent evaluating, less overall cost. Because the PFED can be implemented with generic COTS parts, the vendor's development costs are significantly less. Traditionally vendors of high assurance devices must develop custom architectures and hardware to overcome the assurance deficiencies of a COTS supply chain. And in doing so, re-inventing many of the technologies that come for free in the COTS world that do not have any bearing on the assurance.

The PFED can easily be integrated with an existing product as it imposes very little additional SWAP to a package. The protocol-free nature also allows it to easily be integrated into many other use cases beside mobility since any device can plug in to either end without needing to be aware of the cryptography. The PFED link moves the traditional "encrypted wire" to a "use anywhere" wire given the complete independence of the communications unit and the encryption unit.

The PFED provides numerous advantages over traditional high assurance cryptography. Conventional wisdom says one must do high assurance cryptography in hardware since software typically cannot provide the isolation required or be evaluated to a known state. Yet the architecture of PFED creates very small entry and exit points, and creates a protocol break such that traditionally vulnerable software never touches untrusted data, And the redundancy of two encryption layers ensures that if a mistake occurs in one layer, it's protected by the second layer. Conventional wisdom says a low performance micro controller can't do high performance cryptography. Our implementation can do this at very high rates using very small amount of software, without needing to build a special purpose device such as an FPGA.

While embodiments of the present invention are shown and described, it is envisioned that those skilled in the art may devise various modifications of the present invention without departing from the spirit and scope of the appended claims.

The invention claimed is:

1. A hub and spoke system of encrypting devices, for transmitting packets between trusted devices over an untrusted network comprising:
    an untrusted router, a plurality of server-side encrypting devices and a trusted router hosted on a trusted network server; and
    a plurality of client-side encrypting devices each in communication with a trusted device via a trusted interconnect and in communication with an untrusted network;
    wherein each client-side encrypting device comprises,
    an encryption unit, including a first passive interface for connection to the trusted interconnect and a second passive interface; and
    a communications unit having a passive and an active interface, the communication unit paired with a communications unit of a paired server-side encrypting device via the untrusted network and the active interface;
    wherein each server-side encrypting device comprises,
    an encryption unit, including a first passive interface in communication with the trusted router and a second passive interface; and
    a communications unit paired with a communications unit of a paired client-side encrypting device and linked with the second passive interface of the encryption unit via a connectionless interconnect, the communications unit having an active interface for communication with the untrusted network via the untrusted router;
    wherein the encryption unit of each client-side encrypting device and each server-side encrypting device, encrypts a native packet received at said first passive network interface using a encryption key and adds a connectionless header to the encrypted native packet to form an outgoing connectionless datagram, and receives an incoming connectionless datagram including an encrypted native packet at said second passive interface and decrypts said encrypted native packet using said encryption key; and
    wherein the communications unit of each client-side encrypting device and each server side encrypting device receives an outgoing connectionless datagram, adds a complex header to form a packet for delivery to the paired encrypting device via the active interface, receives a packet including an encrypted native packet and a complex header from the paired encrypting device via an active interface, removes the complex header from said packet, and adds a connectionless header to form a connectionless datagram including an encrypted native packet to be sent to the encryption unit via the passive interface.

2. The system of encrypting devices of claim 1, wherein packets failing a cryptographic authentication check are dropped before entering the trusted router.

3. The system of encrypting devices of claim 1, wherein packets failing a cryptographic authentication check are dropped before entering the trusted device.

\* \* \* \* \*